United States Patent [19]

Motoyama et al.

[11] 4,319,295

[45] Mar. 9, 1982

[54] CASSETTE TAPE RECORDER

[75] Inventors: Kazuyasu Motoyama; Toshikazu Kato, both of Hachioji, Japan

[73] Assignee: Olympus Optical Co., Ltd., Tokyo, Japan

[21] Appl. No.: 124,515

[22] Filed: Feb. 25, 1980

[30] Foreign Application Priority Data

Mar. 2, 1979 [JP] Japan .............................. 54-26468[U]

[51] Int. Cl.³ ............................................ G11B 15/24
[52] U.S. Cl. ............................ 360/137; 242/55.19 A
[58] Field of Search ................. 360/137; 242/55.19 A

[56] References Cited

U.S. PATENT DOCUMENTS 3,947,895  3/1976  Suzuki ................................ 360/137

*Primary Examiner*—Harold I. Pitts

*Attorney, Agent, or Firm*—Frishauf, Holtz, Goodman and Woodward

[57] ABSTRACT

Playback, recording, and stop button plates are slidably mounted in parallel on a base plate. When pressed, the recording button plate engages the playback button plate so as to be locked to a recording position. A seesaw lever, which has a lock strip capable of engaging the playback button plate, is located in a plane across the sliding direction of the playback button plate and attached to the front wall of the base plate. An ejecting plate capable of engaging the stop button plate detects the difference between the displacement of the seesaw lever in the playback or recording mode and that in the stop mode. The stop button plate performs a stopping function without engaging the ejecting plate in the playback and recording modes, and engages the ejecting plate to perform cassette ejection in the stop mode.

15 Claims, 28 Drawing Figures

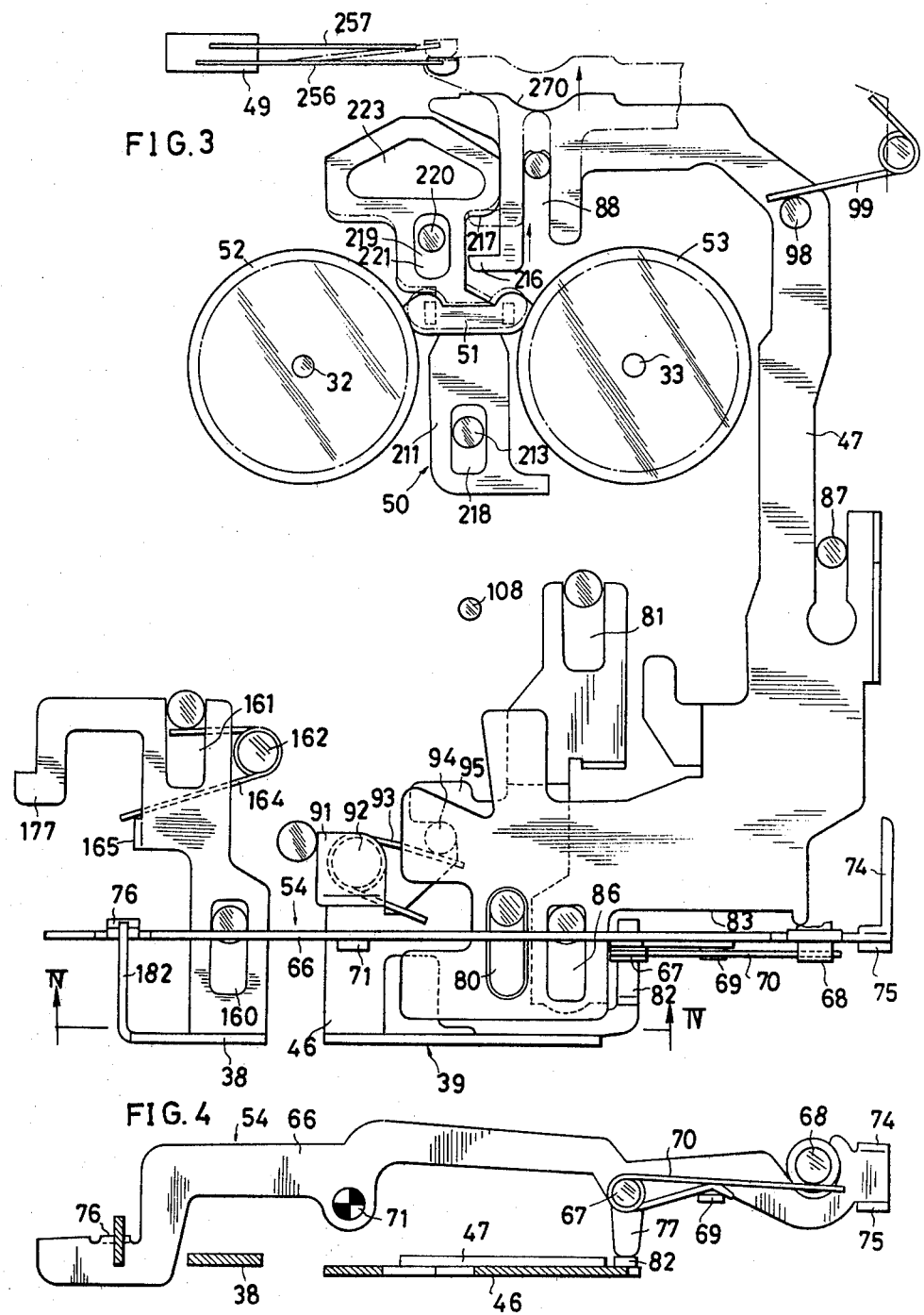

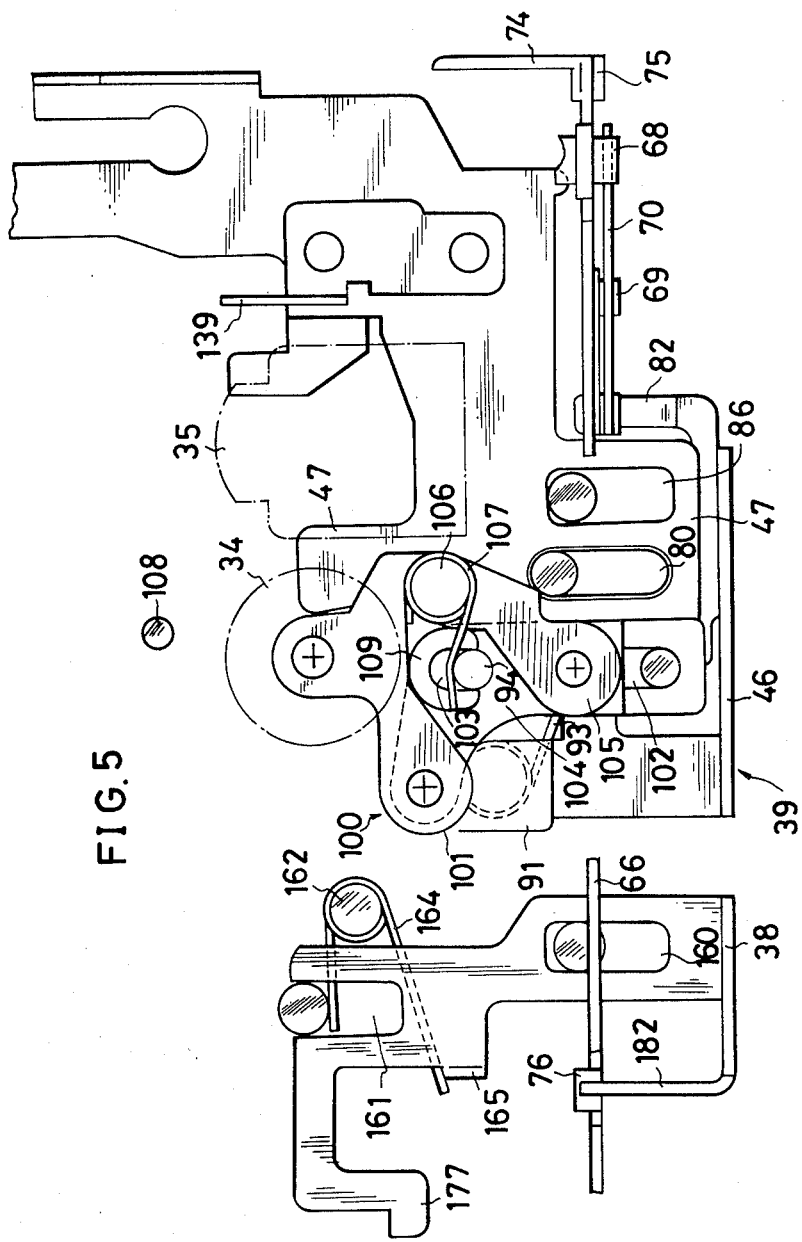

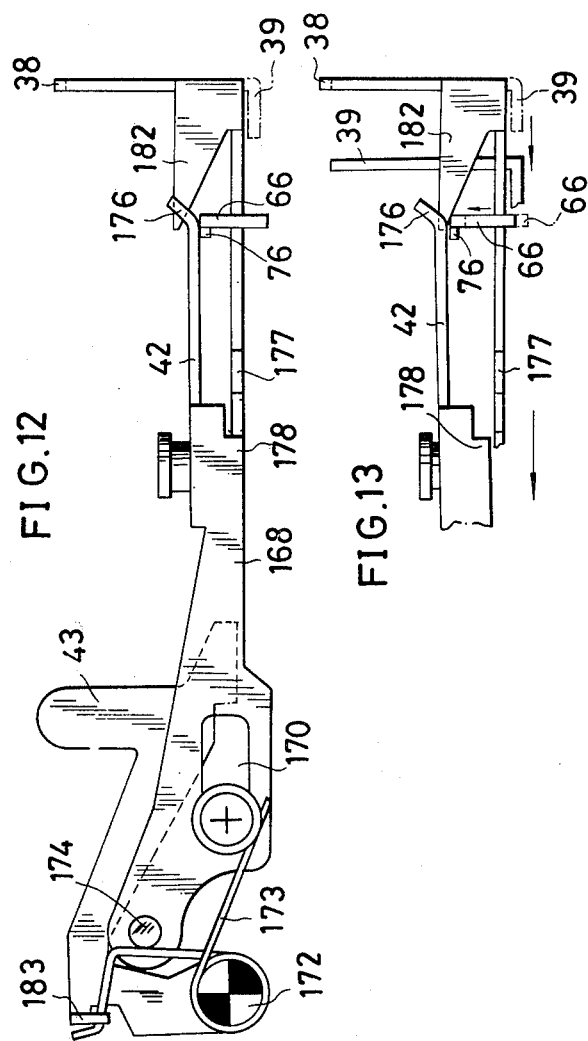

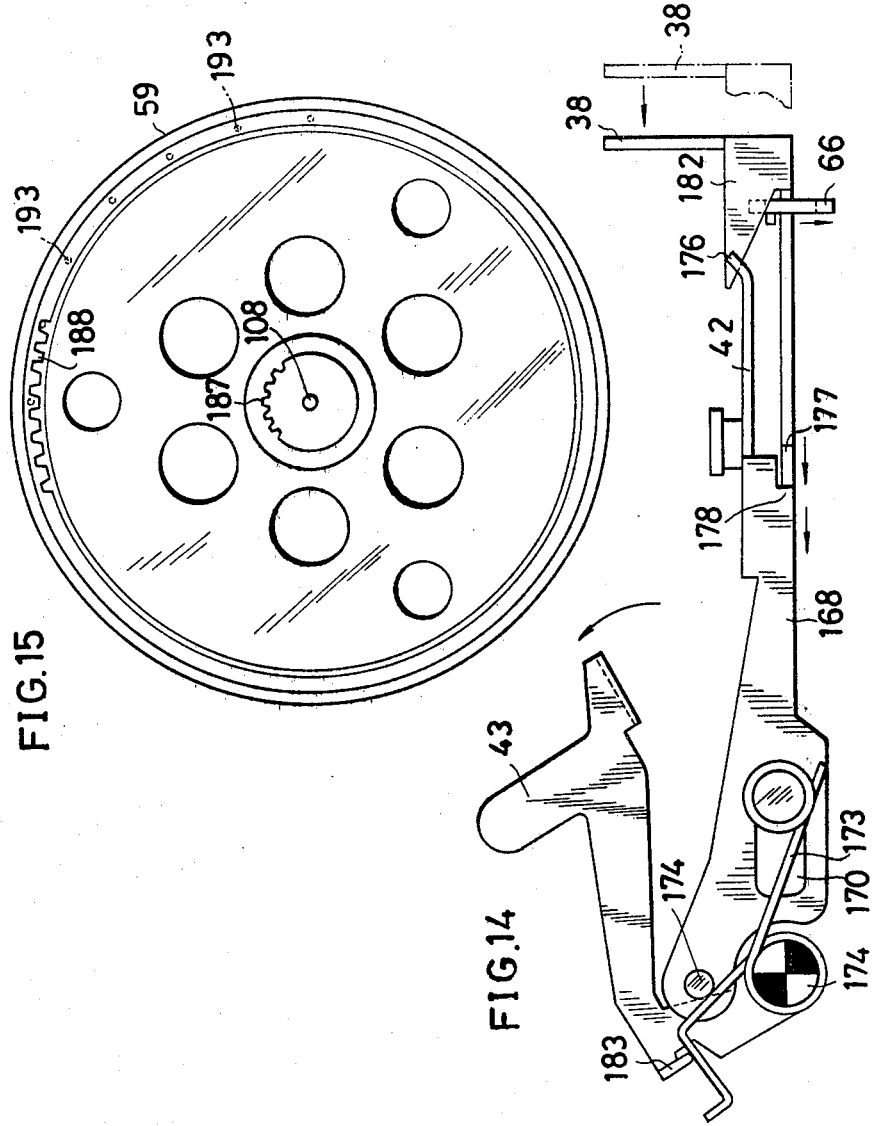

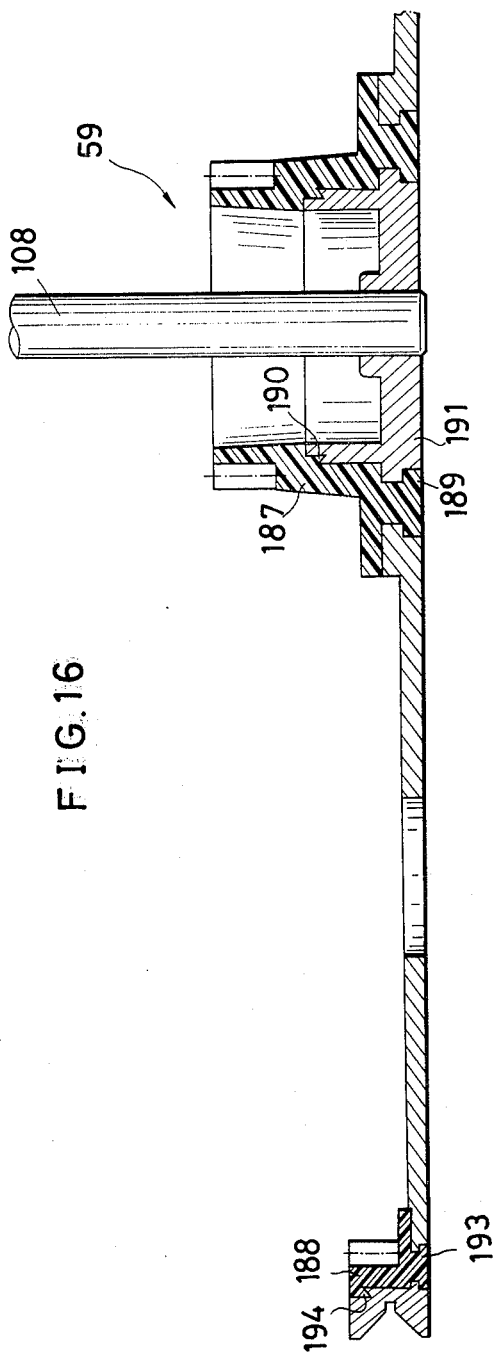

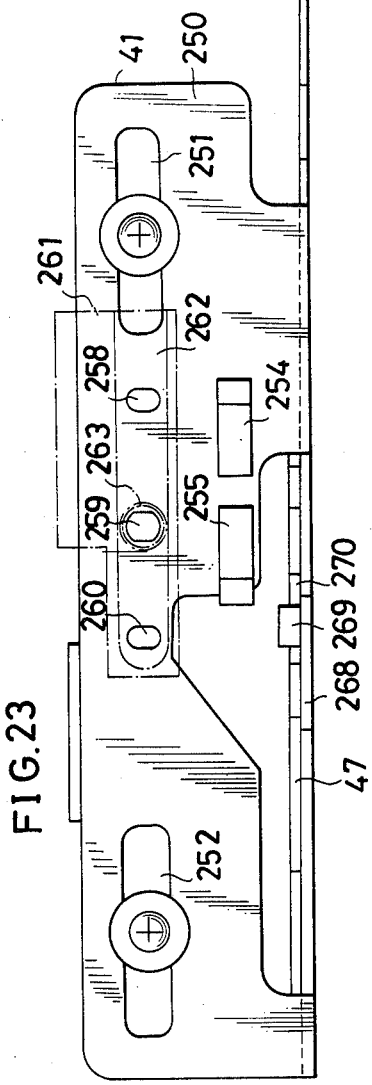
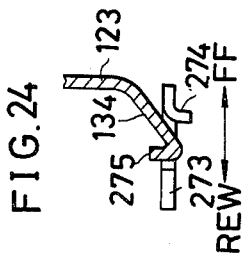

CASSETTE TAPE RECORDER

BACKGROUND OF THE INVENTION

This invention relates to a cassette tape recorder, more particularly to a tape recorder with a stop button performing ejecting function with stopping function.

In a prior art tape recorder, the playback and recording modes are set up by pressing playback and recording buttons, respectively, and the stop mode is set by pressing a stop button. Further, cassette ejection is performed by pressing an ejecting button. Thus, in such prior art tape recorder, the stop and ejecting buttons each have only a single function of their own, so that it is hard to achieve very quick operations. Moreover, the need of both the stop and ejecting buttons cannot help but make the construction of the tape recorder more complex, constituting a hindrance to the miniaturization thereof.

In order to eliminate the aforesaid drawback of the prior art, there is provided a cassette tape recorder which includes a single control member capable of selectively performing stopping and ejecting functions. Known as such cassette tape recorder is a tape recorder which is disclosed in Japanese Utility Model Publication No. 48250/76, for example. This cassette tape recorder is provided with a control lever which is pivotably mounted on an ejecting plate so as to be able to rock with a brake release plate when any one of slidable operating buttons, such as play, FF and REW buttons, is pressed. When one of these operating buttons is pressed to set the tape recorder for an operating mode, the operating button causes the brake release plate to slide therewith to release the brake force, and is locked by a slidable lock plate. The slide of the brake release plate causes the control lever to rock into a position where the control lever cannot engage a rockable stop lever. If the stop lever is rocked while the tape recorder is in the operating mode, the operating button is released from the lock plate to stop a tape driving mechanism, and at the same time the brake release plate returns to its original position to actuate a brake mechanism, thereby setting up the stop mode. At this time, the control lever is rocked, in conjunction with the action of the brake release plate, to a position where it can engage the stop lever. Thus, if rocked in the stop mode, the stop lever will abut against the control lever to slide the ejecting plate along with the control lever so as to release a cassette holder from engagement with the ejecting plate, thereby achieving ejection of the cassette holder, i.e. cassette ejection. However, including the slidable lock plate and the rockable control lever provided separately, even this construction is subject to the defect in simplicity.

As another example of the cassette tape recorder including a single control member capable of selectively performing stopping and ejecting functions, there is known one that is disclosed in U.S. Pat. No. 3,947,895 by Suzuki issued on Mar. 30, 1976. This cassette tape recorder is provided with a stop lever on which a cam member with a shoulder capable of engaging an ejecting lever is rockably mounted. Further, when one of a pair of function control levers is pressed to set the tape recorder for the playback or recording mode, the pressed function control member abuts against a slidable lock lever intersecting the function control lever to slide the lock lever, and thereafter is locked by the lock lever. Including a reduced number of members, this cassette tape recorder is simple in construction and cheap in production cost. However, since the lock lever is normally sandwiched between the stop lever and cam member, that is, three members are piled up on a structural frame, so it is hard to reduce the thickness of the tape recorder. Moreover, the lock lever is formed of an angle plate which has a projection to abut against the cam member and a tab fitted with one end of a compression coil spring stretched between the cam member and the lock lever. Such angle plate would make it further difficult to slim the tape recorder.

SUMMARY OF THE INVENTION

It is therefore an object of this invention to provide a slim and compact cassette tape recorder improved in operating capability by the use of a stop button which may perform at least dual function.

In order to attain the above object, the tape recorder according to this invention is so constructed that a seesaw lever as a lock member is disposed in a plane not parallel to but crossing the sliding direction of a playback button plate, thereby avoiding overlapping of the plate members for the slimness of the whole structure. Moreover, a stop button plate can perform dual function by utilizing the difference in the displacement of the seesaw lever between several modes.

It is another object of the invention to provide a cassette tape recorder with a reduced number of members, simple in construction and cheap in production cost.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWING

This invention can be more fully understood from the following detailed description when taken in conjunction with the accompanying drawings, in which:

FIG. 3 is a top plan view mainly showing a playback button plate and a lock mechanism;

FIG. 4 is a front view as taken along line IV—IV of FIG. 3, mainly showing the lock mechanism;

FIG. 5 is a top plan view mainly showing the playback button plate;

FIG. 12 is a left side view in the stop mode;

FIG. 13 is a partial left side view in the playback or recording mode;

FIG. 14 is a left side view in the stop mode illustrating ejecting action (FF. REW release plate is taken off in FIGS. 23, 13 and 14);

FIG. 15 is a top plan view of a flywheel built in the tape recorder;

FIG. 16 is a partial longitudinal sectional view of the flywheel;

FIG. 23 is a rear view of the shift button plate;

FIG. 24 is a front view as taken along line XXIIII—XXIIII of FIG. 17.

DETAILED DESCRIPTION OF THE PREFERRED EMBODIMENT

Now there will be described in detail one preferred embodiment of this invention with reference to the accompanying drawing. Although embodied in a cassette tape recorder using a micro cassette, according to this embodiment, the invention is not limited to the tape recorder of such type.

Figure 1:
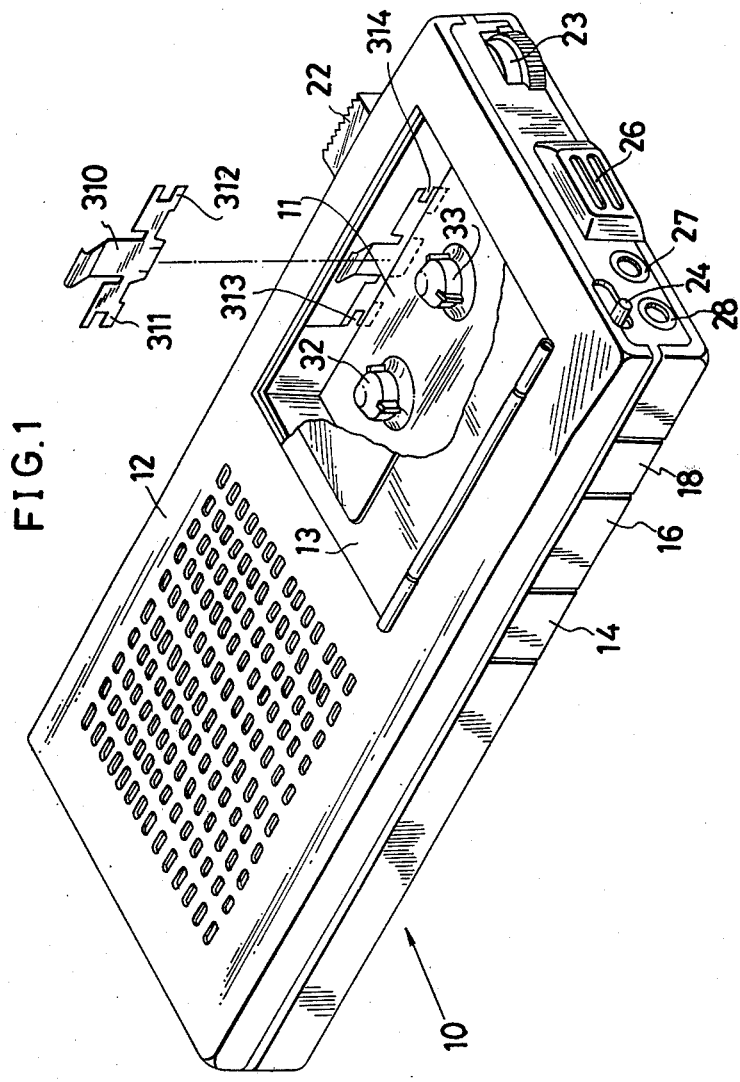
FIG. 1 is a schematic perspective view of a tape recorder according to one preferred embodiment of this invention.

As shown in this schematic exterior view of FIG. 1, a tape recorder 10 according to this invention includes a recorder body 12 in which a tape cassette holder 11 is defined at the top surface thereof. The tape cassette holder 11 is covered with an openable hinged cover 13. A stop button 14, a playback button 16, and a recording button 18 are arranged on one side of the recorder body 12. A shift button 22 for switching between fast forward (FF) and rewinding (REW) operations is disposed on another side of the recorder body 12, and a volume knob 23 and a pause button 24 are arranged on the top and face of the recorder body 12. Besides the FF and REW operations, a cue or review operation may be set by operating the shift button 22. Further, a condenser microphone 26, a microphone jack 27, and an earphone jack 28 are arranged on the top end face of the recorder body 12.

A base plate is fixed inside the recorder body 12. A pair of reel shafts 32 and 33, a pinch roller 34, a magnetic head 35, an erasing head 36, etc. (FIG. 2) are disposed on the upper surface of the base plate, while many other components are mounted on the under surface of the base plate. The base plate is preferably made not of metal but of synthetic resin for its lightness. In the drawings referred to below, however, the base plate is omitted for simplicity, and the stop button 14, playback button 16, and recording button 18 are deemed to be located below each drawing to facilitate the understanding of the operation. For the clearness of illustration, moreover, shifts and pins to function as rocking centers are expressly represented by symbols ⊗ in some of these drawings.

Figure 2:
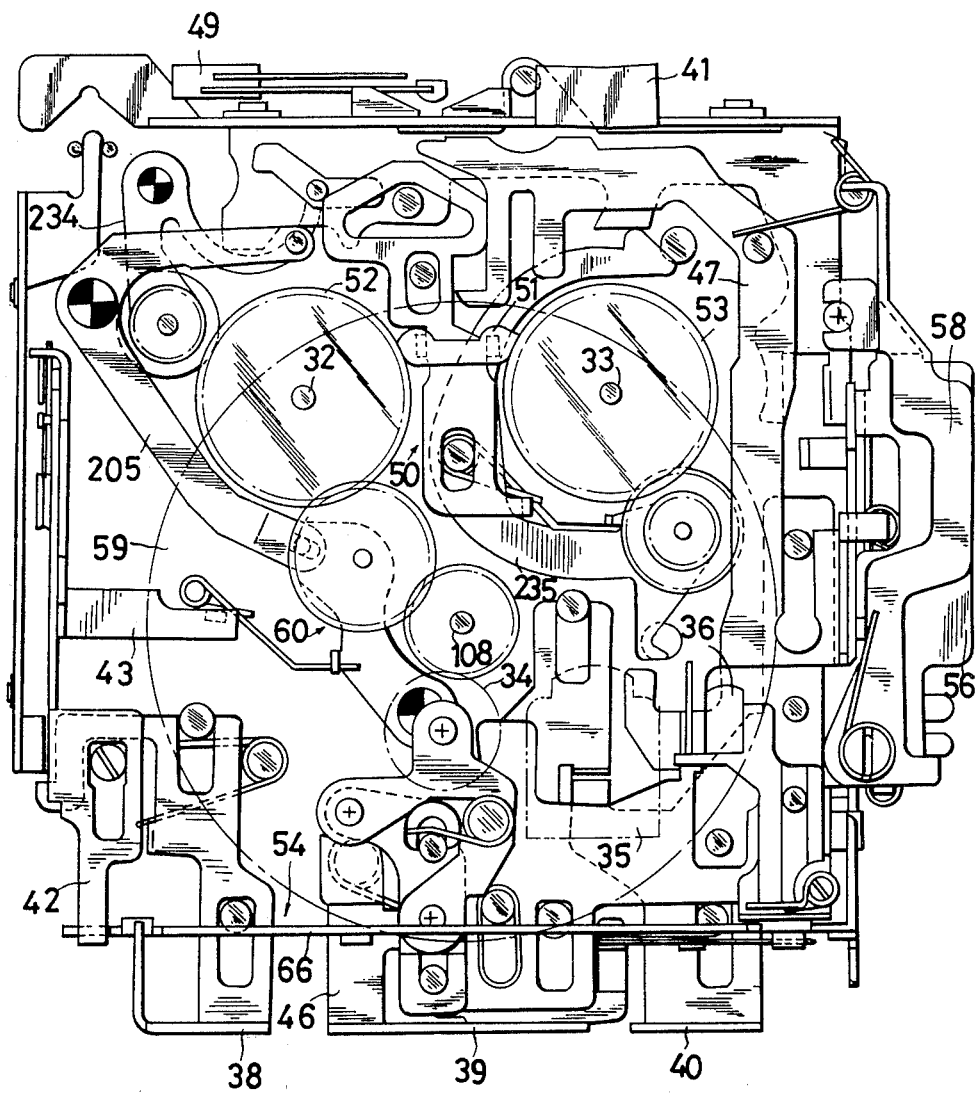
FIG. 2 is a top play view of the internal structure of the tape recorder of FIG. 1, with a base plate taken off (front, right side, left side, and rear views mentioned below are all based on FIG. 2)

Referring now to FIG. 2 which shows various components mounted on the base plate, the stop button 14, playback button 16, and recording button 18 (FIG. 1) are fixed to a stop button plate 38, a playback button plate 39, and a recording button plate 40 (FIG. 2) respectively. The stop button plate 38 has a dual function; it not only sets the stop mode but causes an ejecting plate 42 to interlock with an ejecting lever 43 for cassette ejection. The playback button plate 39 is formed of a first playback button plate 46 to which the playback button 16 is fixed and a second playback button plate 47 provided with the pinch roller 34 and magnetic head 35 and extending close to a shift button plate 41. Located under the base plate, the second playback button plate 47 is interposed between the first playback button plate 46 and the base plate. When the first playback button plate 46 is pressed, the second playback button plate 47 is pressed together. By the shifting of the second playback button plate 47, a power switch 49 is turned on, and a brake shoe 51 of a brake mechanism 50 is disengaged from reel gears 52 and 53, thereby removing the braking function. Further, the playback button plate 39 is locked to the position i.e. playback position, by a seesaw lever 66 of a lock mechanism 54 on the front wall of the base plate. On the right side of the base plate, there is fixed a support base plate 56 as an auxiliary base plate which constitutes a part of the base plate, and an erroneous erasing preventive lever 58 is rockably mounted on the support base plate 56. To secure enough mechanical strength, the support base plate 56 is made of metal. As long as necessary strength is ensured, however, the support base plate 56 may be formed of synthetic resin, together with the base plate. Driving force transmitted from a motor (not shown) to a flywheel 59 by the operation of the power switch 49 is transmitted to one of the reel shafts 32 and 33 by means of a driving mechanism 60 including a number of gears which properly engage one another according to the operating mode.

Further in detail will now be described individual components of the tape recorder. As for the lock mechanism 54, it is provided with the seesaw lever 66 ehich is rockably mounted on the front wall of the base plate, as seen from FIGS. 2 to 4. The seesaw lever 66 is disposed on a plane at right angles to the base plate and playback button plate 39, and is subjected to clockwise biasing force around a rocking shaft 71 by a torsion spring 70 which is wound around a pin 67 on the seesaw lever 66 and has its both ends in contact with a pin 68 on the support base plate 56 and a bent strip 69 of the seesaw lever 66 respectively, as shown in FIG. 4. The pin 68 also functions as a stopper to restrict the counterclockwise rocking movement of the seesaw lever 66. The seesaw lever 66 has, at one end portion thereof, an inwardly bent engaging strip 74 on the upper edge and an outwardly bent engaging strip 75 on the lower edge. At the other end portion of the seesaw lever 66, there is an inwardly bent guide strip 76 formed on the upper edge. The clockwise rocking movement of the seesaw lever 66 is restricted by a downwardly extending lock strip 77 of the seesaw lever 66 and the first playback button plate 46 of the playback button plate 38 which abuts each other.

As seen from FIG. 3, the first playback button plate 46 is guided in its way of sliding by a pair of guides 80 and 81 which each consists of a guide pin embedded in the base plate and a guide slot defined in the first playback button plate 46. The lock strip 77 of the seesaw lever 66 is brought in contact with a stepped strip 82 of the first playback button plate 46, the stepped strip 82 being substantially flush with the second playback button plate 47. When the first playback button plate 46 is pressed to slide, the tip end of the stepped strip 82, which normally is a little apart from an end face 83 of the second playback button plate 47, comes in contact with the end face 83 in the latter half of its sliding stroke to slide also the second playback button plate 47.

The second playback button plate 47 overlying the first one 46 is guided in its way of sliding by three guides 86, 87 and 88 each consisting of a guide pin and a guide slot. One end of a torsion spring 93, which is wound around a pin 92 on the under surface of another stepped strip 91 of the first playback button plate 46, engages a pin 94 extending downward from the second playback button plate 47, thereby biasing the pin 94 against a stopper strip 95 of the first playback button plate 46. After all, the pin 94 is elastically held between the stopper strip 95 and the one end of the torsion spring 93, thereby ensuring an united motion of the first and second playback button plates 46 and 47. The other end of the torsion spring 93 is in contact with the step portion of the stepped strip 91. Since one end of a torsion spring 99 on the base plate abuts a pin 98 on the second playback button plate 47, the playback button plate 39 is biased or pressed toward an original position or a non-operating position.

When the first playback button plate 46 is pressed and shifted from its original position along with the playback button 16, pressure is transmitted to the second playback button plate 47 through the elastic hold of the pin 94, thereby sliding the first and second playback button plates 46 and 47 inward against the biasing force of the torsion spring 99. The stroke of such sliding is guided by the guides 80, 81, 86, 87 and 88. Brought in contact with the stepped strip 82 of the first playback button plate 46 by the biasing force of the torsion spring 70, the lock strip 77 of the seesaw lever 66 slides on the stepped strip 82 during the sliding stroke. Before the sliding stroke is ended, the lock strip 77 falls from the stepped strip 82 onto a portion of the first playback button plate 46 on the lower level. Even if the pressure is removed from the first playback button plate 46 after the lock strip 77 has fallen off the stepped strip 82, the playback button plate 39 will be prevented from returning to the original position by the lock strip 77 engaging the stepped strip 82, and locked to the operating position.

A conventional lock mechanism is generally provided with a lock member to rock horizontally, whereas the lock mechanism 54 of this invention has the seesaw lever 66 to rock vertically as its lock member, whereby the horizontal setting space of the lock mechanism is reduced. Moreover, the seesaw lever 66 is not overlapped on the base plate, so that it requires no setting space of its own in the direction across the thickness of the base plate. Namely, the seesaw lever 66 is only disposed in the space that has conventionally been a dead space, requiring no additional space. Thus, there may be obtained a tape recorder with improved compactness and reduced thickness. Since the seesaw lever 66 is mounted on the front wall of the base plate, furthermore, the front wall may increase its rigidity as against the pressure on the stop button 14, playback button 16, and recording button 18. The seesaw lever 66 need not be exactly at right angles to the playback button plate 39, provided that the playback button plate 39 can be locked or that the seesaw lever 66 crosses the playback button plate 39 at an angle within a suitable range centering on 90°.

As illustrated, the playback button plate 39 includes the first and second playback button plates 46 and 47 overlapping each other and coupled with each other through the elastic hold of the pin 94 by means of the torsion spring 93. The stepped strip 82 of the first playback button plate 46 is spaced a little from the end face 83 of the second playback button plate 47. Accordingly, when the first playback button plate 46 is pressed with the playback button 16, the second playback button plate 47 is slid together with the first playback button 46 through the elastic hold of the pin 94. When the second playback button plate 47 is slid over a certain distance, it stops temporarily. Thereafter, when the stepped strip 82 hits against the end face 83 of the second playback button 47, the second playback button plate 47 is further slid. When the pressure on the playback button 16 is removed, the first playback button plate 46 is pushed back to its predetermined lock position by the biasing force of the torsion spring 93. Then, the biasing force of the torsion spring 93 is transmitted to the stopper strip 95 by way of the pin 94, and thus the second playback button plate 47 is further slid over a little distance and located in its predetermined lock position.

As compared with the single plate constituting the playback button plate in the prior art construction, the playback button plate 39 of this invention is composed of the two playback button plates 46 and 47. Moreover, the second playback button plate 47 to which no direct pushing force or pressure is applied is fitted with the magnetic head 35, and is always subjected to the biasing force of the torsion spring 93. Thus, the head will never be shifted, thereby preventing any change of the quality of sound in the playback mode. In the cue or review mode, it is necessary only that the second playback button plate 47 be spaced a little distance from a magnetic tape against the biasing force of the torsion spring 93. That is, it is not necessary to retreat the whole body of the playback button plate 39. Here it is to be understood that the stepped strip 82 of the first playback button plate 46 is kept apart enough from the end face 83 of the second playback button plate 47 to allow the shifting of the second playback button plate 47. The pinch roller 34, which is also mounted on the second playback button plate 39, is pressed against a capstan shaft not directly by the pressure on the first playback button plate 46 but elastically by the biasing force of the torsion spring 93. Thus, a constant pushing force independent of the pressure on the first playback button plate 46 is transmitted from the pinch roller 34 to the capstan shaft. Namely, the torsion spring 93 interposed between the two playback button plates 46 and 47 functions also as a shock absorber.

In the prior art construction the pinch roller is supported by a rockable pinch support lever, whereas in a pinch roller mechanism 100 of this invention, as shown in FIG. 5, the pinch roller 34 is supported by the slidable playback button plate 39. Therefore, the slide-type pinch roller mechanism 100 which slides together with the playback plate 39 only requires a narrow sliding space, as compared with a wide horizontal rocking range which is needed for the prior art rocking pinch roller support lever. Thus, with the pinch roller mechanism 100 of this invention, the horizontal space may effectively be utilized as the setting space for e.g. a liquid-crystal counter, audio amplifier, and other components. A pinch roller support plate 101 supporting the pinch roller 34 is formed of a first support plate 104 slidably mounted on the second playback button plate 47 by means of two guides 102 and 103 each consisting of a guide pin and a guide slot, and a second support plate 105 fixed on the first support plate 104 by means of bolts. The first support plate 104 is slidably mounted on the second playback button plate 47 with snap rings engaging their corresponding guide pins of the guides 102 and 103. Here the pin 94 of the second playback button plate 47 functions also as the guide pin of the guide 103. The pin 94 extends along a partially circular upright guide wall 109, and is in full contact with the inside of the guide wall 109 along the axial direction of the pin 94, thereby sufficiently restraining the occurrence of lateral play in the pinch roller support plate 101. Thus, the pinch roller 34 may sufficiently be prevented from inclining in the running direction of the magnetic tape. Further, both ends of a torsion spring 107 which would around pin 106 on the second support plate 105 abut the pin 94 and an end face of the second support plate 105, respectively. Consequently, the pinch roller 34 is always subjected to inward biasing force by the torsion spring 107, and is prevented from inclining sideways by the upright guide wall 109. Thus, the pinch roller 34 may come in contact with a capstan shaft 108 without inclining under constant biasing force.

The recording button plate 40 adjoining the playback button plate 39, located below the second playback button plate 47, is substantially flush with the first playback button plate 46. As seen from FIGS. 2, 6 and 7, the recording button plate 40 has an abutment strip 112 capable of abutting against the first playback button plate 46, while the first playback button plate 46 has a bent strip 113 to ensure the engagement of the abutment strip 112. Moreover, the recording button plate 40 is biased toward its original position by a tension coil spring 117 which is stretched between an L-shaped strip 115 bent to the right from a vertical bent strip 114 extending along the right side of the base plate and a strip 116 bent downward from the support base plate 56. The slide of the recording button plate 40 is guided by a pair of guides 120 and 121 each consisting of a guide pin and guide slot. The guide pin and guide slot of the guide 120 function also as the counterparts of the guide 87 of the playback button plate 46. The original position of the recording button plate 40 is restricted by the engagement of a forked strip 118 bent from the vertical bent strip 114 with a stopper strip 119 bent downward from the erroneous erasing preventive lever 58. A rocking lever 123 is rockably mounted on the right side of the vertical bent strip 114 of the recording button plate 40. The rocking lever 123 is subjected to clockwise biasing force around a rocking shaft 127 of FIG. 7, with one end of a torsion spring 125, which is wound around a pin 124 attached to the downward bent strip 57 of the support base plate 56, abutting against a pin 126 on the rocking lever 123. An eccentric pin 130 attached to a downward bent strip 57 of the support base plate 56 functions as a stopper for the rocking lever 127. The eccentric pin 130 functions also as a stopper for the seesaw lever 66 of the lock mechanism 54, engaging the engaging strip 74. Thus, the unrocked position of the rocking lever 123 and the rocked position of the seesaw lever 66 may be controlled by suitably turning the eccentric pin 130. The rocking lever 123 has an abutment strip 132 and a curved engaging strip 134 (see FIG. 24) at the inward end portion, as well as an abutment strip 131 at the outward end portion. The abutment strips 131 and 132 are capable of abutting the engaging strip 75 of the seesaw lever 66 and an abutment strip 133 formed on an upward bent strip of the second playback button plate 47, respectively.

Figure 6:
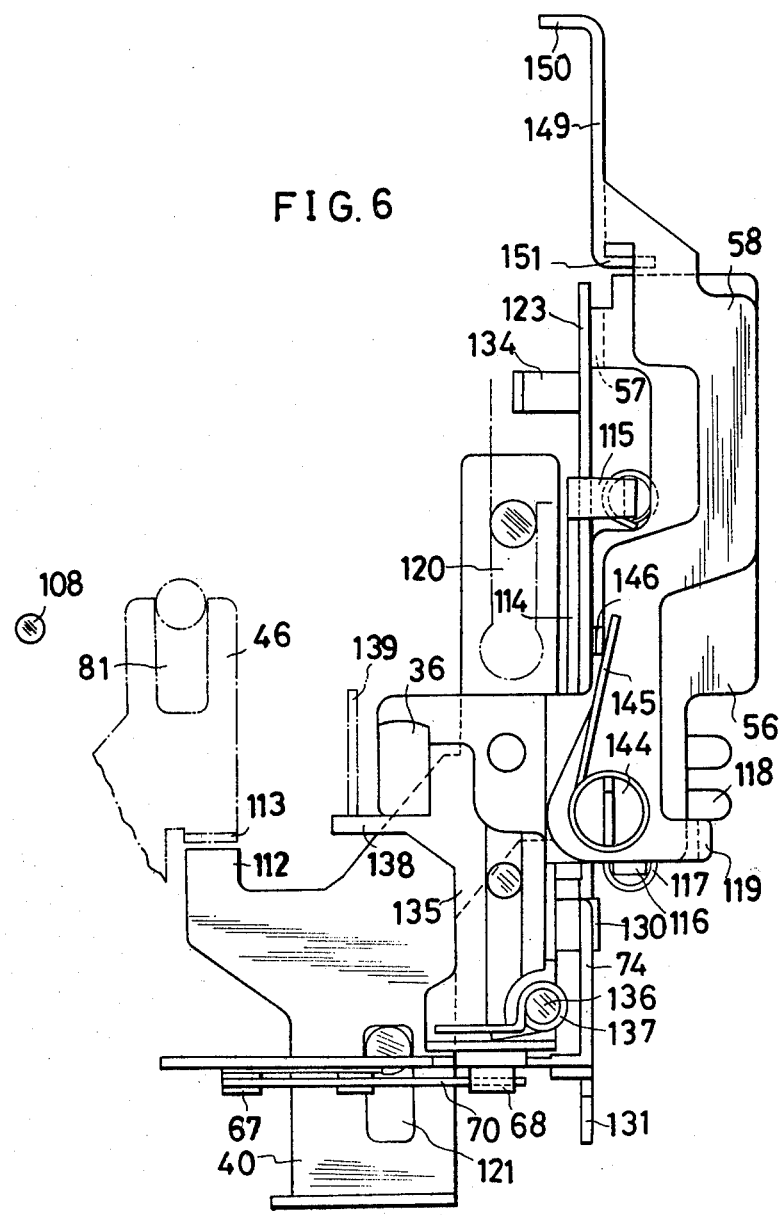
FIGS. 6 and 7 are a top plan view and a right side view mainly showing a recording button plate, respectively.

On the recording button plate 40, as seen from FIG. 6, there is slidably mounted an erasing head support plate 135 on which the erasing head 36 is mounted. The erasing head support plate 135 is pushed inward by the biasing force of a torsion spring 137 wound around a pin 136 on the base plate. With a projecting strip 138 of the erasing head support plate 135 abutting a tape guide strip 139 on the second playback button plate 47, the position of the erasing head 36 is restricted. Thus, the erasing head 36 is positioned automatically by utilizing the tape guide strip 139, so that there is required no special positioning member.

Figure 7:
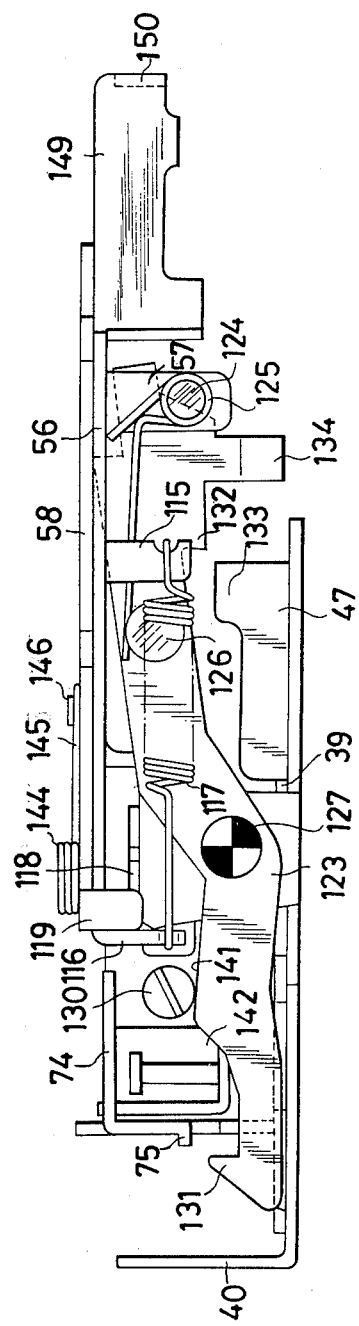
Figure 8:
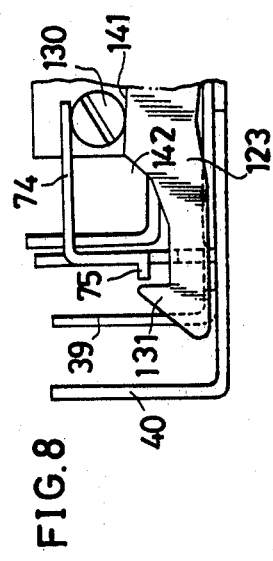
FIG. 8 is a partial right side view in the playback mode.

With the playback buttonplate 39 and recording button plate 40 in their respective original positions, the abutment strip 133 of the second playback button plate 47 is located below the abutment strip 132 of the rocking lever 123, as shown in FIG. 7. Therefore, even if the playback button plate 39 is pressed, the abutment strip 133 will not engage the abutment strip 132, keeping the recording button plate 40 from sliding with the playback button plate 39. When pressed, the playback button plate 39 is locked to the depressed position by the clockwise rocking (FIG. 4) of the seesaw lever 66 of the lock mechanism 59, as mentioned before. When the seesaw lever 66 is rocked clockwise until the upper engaging strip 74 abuts against the eccentric pin 130, the lower engaging strip 75 of the seesaw lever 66 is so located as to be able to abut against the abutment strip 131 of the rocking lever 123 on the recording button plate 40, as shown in FIG. 8. Accordingly, if the recording button 18 is pressed for followup recording in the playback mode, the abutment strip 131 of the rocking lever 123 will abut against the engaging strip 75 of the seesaw lever 66 to prevent the recording button plate 40 from sliding, keeping the recording button plate 40 from being pushed in. Namely, the follow-up recording is prevented only by the existence of the abutment strip 131 of the rocking lever 123, so that it may very easily be enabled by removing the abutment strip 131, depending on the type of the tape recorder or at user's request. Thus, the capability of the tape recorder to perform follow-up recording depends on the existance of the abutment strip 131; a tape recorder capable or incapable of follow-up recording may optionally be provided by choosing between rocking levers with and without the abutment strip 131.

Excepting the follow-up recording, with the prior art tape recorder, the recording mode may be set by simultaneously pressing the playback and recording buttons. With the construction of this invention, on the other hand, only a single press on the recording button plate 40 will slide the playback button plate 39 together with the recording button plate 40, thereby setting the recording mode. That is, by pressing the recording button 18, the abutment strip 112 of the recording button plate 40 is brought in contact with the bent strip 113 of the first playback button plate 46 to push the first and second playback button plates 46 and 47 together, as seen from FIG. 6. As shown in FIG. 7, the rocking lever 123 of the recording button plate 40 has a notch 142 adjacent to an upper edge 141 which abuts the eccentric pin 130. When the recording button plate 40 is pushed, the rocking lever 123, which is subjected to the clockwise biasing force (FIG. 7) of the torsion spring 125, rocks clockwise until the eccentric pin 130 is located in the notch 142. At the same time, the abutment strip 132 of the rocking lever 123 is moved to such a position that it may engage the abutment strip 133 of the second playback button plate 47. Thus, the abutment strips 132 and 133 abut against each other, and the recording button plate 40 biased toward its original position by the coil spring 117 is locked to the depressed position (see FIG. 9).

Now the pressing stroke of the recording button plate 40 will be described in detail. With the abutment strip 112 of the recording button plate 40 abutting the bent strip 113 of the first playback button plate 46, the recording button plate 40 slides to a prescribed depressed position, accompanied by the first and second playback button plates 46 and 47. Thereafter, when the pushing force is removed, and recording button plate 40 is pushed back by the biasing force of the coil spring 117 until the abutment strip 132 comes in contact with the abutment strip 133, and is locked by such contact between the abutment strips 132 and 133. Naturally, in the illustrated construction, the recording button plate 40 may be pressed not only singly but also together with the playback button plate 39.

Figure 10:
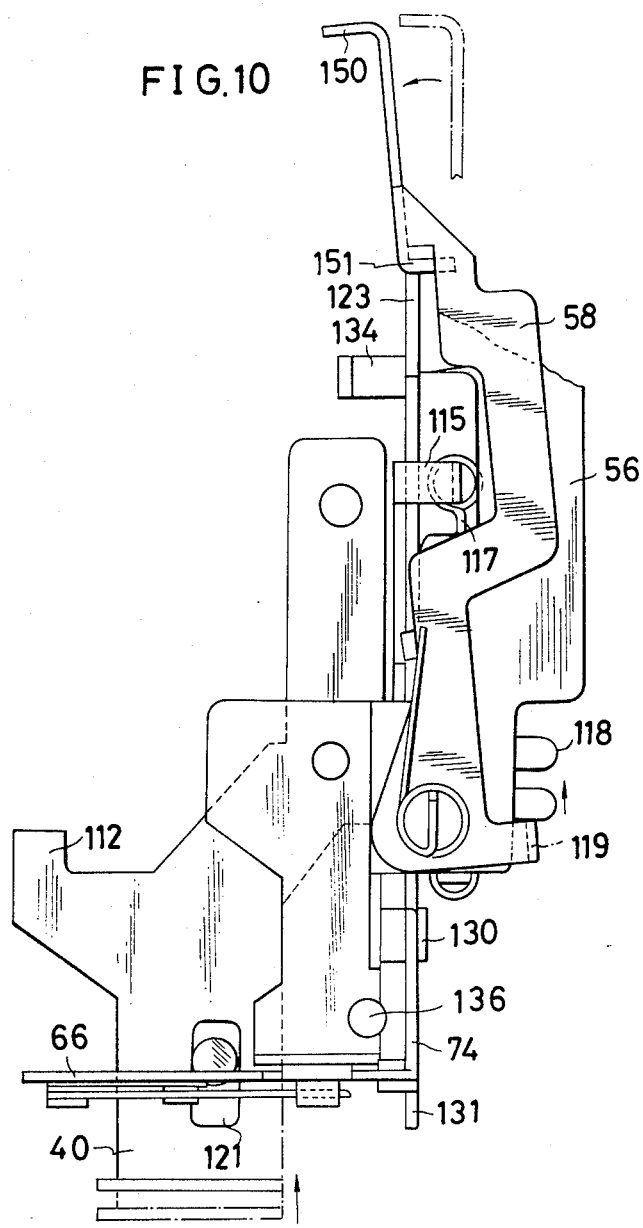
FIG. 10 is a top plan view illustrating the action of an erroneous erasing preventive lever.

As shown in FIG. 6, the erroneous erasing preventive lever 58 is mounted on the support base plate 56 by means of a slotted screw 144 around which a torsion spring 145 is wound. One end of the torsion spring 145 is fitted in the slot of the slotted screw 144, while the other end thereof presses on an upward bent strip 146 of the erroneous erasing preventive lever 58. Accordingly, the erroneous erasing preventive lever 58 is subjected to counterclockwise biasing force (FIG. 6) by the torsion spring 145 and is restricted in its rocking by the engagement of the downwardly bent stopper strip 119 with the forked strip 118. As seen from FIG. 6, an erroneous erasing preventive strip 150, capable of engaging an erroneous erasing preventive lug of a tape cassette (not shown) set in the cassette holder 11, and a stopper strip 151 moving into the sliding path of the rocking lever 123 of the recording button plate 40 to prevent the slide of the lever 123 extend laterally in opposite directions from a downward bent strip 149. Where recording is undone, with the erroneous erasing preventive lug on the set tape cassette unremoved, the erroneous erasing preventive strip 150 of the erroneous erasing preventive lever 58 will be rocked a little in the counterclockwise direction by the biasing force of the torsion spring 145 immediately to press on the erroneous erasing preventive lug of the tape cassette if the recording button 18 is pressed to move the forked strip 118 of the recording button plate 40. Accordingly, the erroneous erasing preventive lever 58 is prevented from further rocking counterclockwise, keeping the stopper strip 151 from moving into the sliding path of the rocking lever 123. Thus, the recording button plate 40 can continue to be pushed without hindrance, and the recording mode is set. However, if the set tape cassette is one without the erroneous erasing preventive lug which has already done recording, then the stopper strip 151 can enter the tape cassette through a hole left as a result of the removal of the erroneous erasing preventive lug, without being arrested by the lug. Accordingly, even if the recording button plate 40 is pressed by mistake where the tape cassette without erroneous erasing preventive lug is set, the erroneous erasing preventive lever 58 will be rocked quickly in the counterclockwise direction by the biasing force of the torsion spring 145, following the movement of the forked strip 118, so that the stopper strip 151 may enter the cassette tape. Then, as shown in FIG. 10, the counterclockwise rocking of the erroneous erasing preventive lever 58 causes the stopper strip 151 to move into the sliding path of the rocking lever 123, so that the inward end of the rocking lever 123 is forced to run against the stopper strip 151, thereby preventing the recording button plate 40 from sliding. The play of the recording button plate 40, existing before the slide is prohibited, depends on the space between the inward end of the rocking lever 123 and the stopper strip 151, as well as on the original position of the erroneous erasing preventive lever 58. Here the original position of the erroneous erasing preventive lever 58 is determined by the engagement between the forked strip 118 and the stopper strip 119. Accordingly, the original position of the erroneous erasing preventive lever 58 may easily be controlled by changing the shape of a contact prong of the forked strip 118 which abus against the stopper strip 119. Here the contact prong of the forked strip 118 can be transformed easily by utilizing its intermediate slit.

As described above, the erroneous erasing preventive lever 58, having the erroneous erasing preventive strip 150 and stopper strip 151 at its one end portion which is fully separated from the rocking shaft 127, is always subjected to the biasing force of the torsion spring 145 so that it may rock quickly, accompanying the slide of the recording button plate 40. Accordingly, just a little slide of the recording button plate 40 will secure rapid detection of the existence of the tape cassette lug, thereby perfectly preventing erroneous erasing of sound recorded on the tape. Further, the play of the recording button plate 40 may easily be controlled by transforming the contact prong of the forked strip 118 of the recording button plate 40 which abuts against the stopper strip 119 of the erroneous erasing preventive lever 58.

Also below the base plate, as shown in FIG. 2, the stop button plate 38 fitted with the stop button 14 adjoins the playback button plate 39 on the opposite side thereof to the recording button plate 40. As seen from FIG. 11, the stop button plate 38 is guided in its way of sliding by a pair of guides 160 and 161 each consisting of a guide pin extending downward from the base plate and a guide slot defined in the stop button plate 38. Both ends of a torsion spring 164 which is wound around a pin 162 extending downward from the substrate press on the guide pin of the guide 161 and a downward bent strip 165 of the stop button plate 38, respectively, whereby the stop button plate 38 is biased toward its original position. Moreover, the original position of the stop button plate 38 is restricted by the abutment of the guide pin of the guide 160 against the end face of the guide slot thereof.

Figure 11:
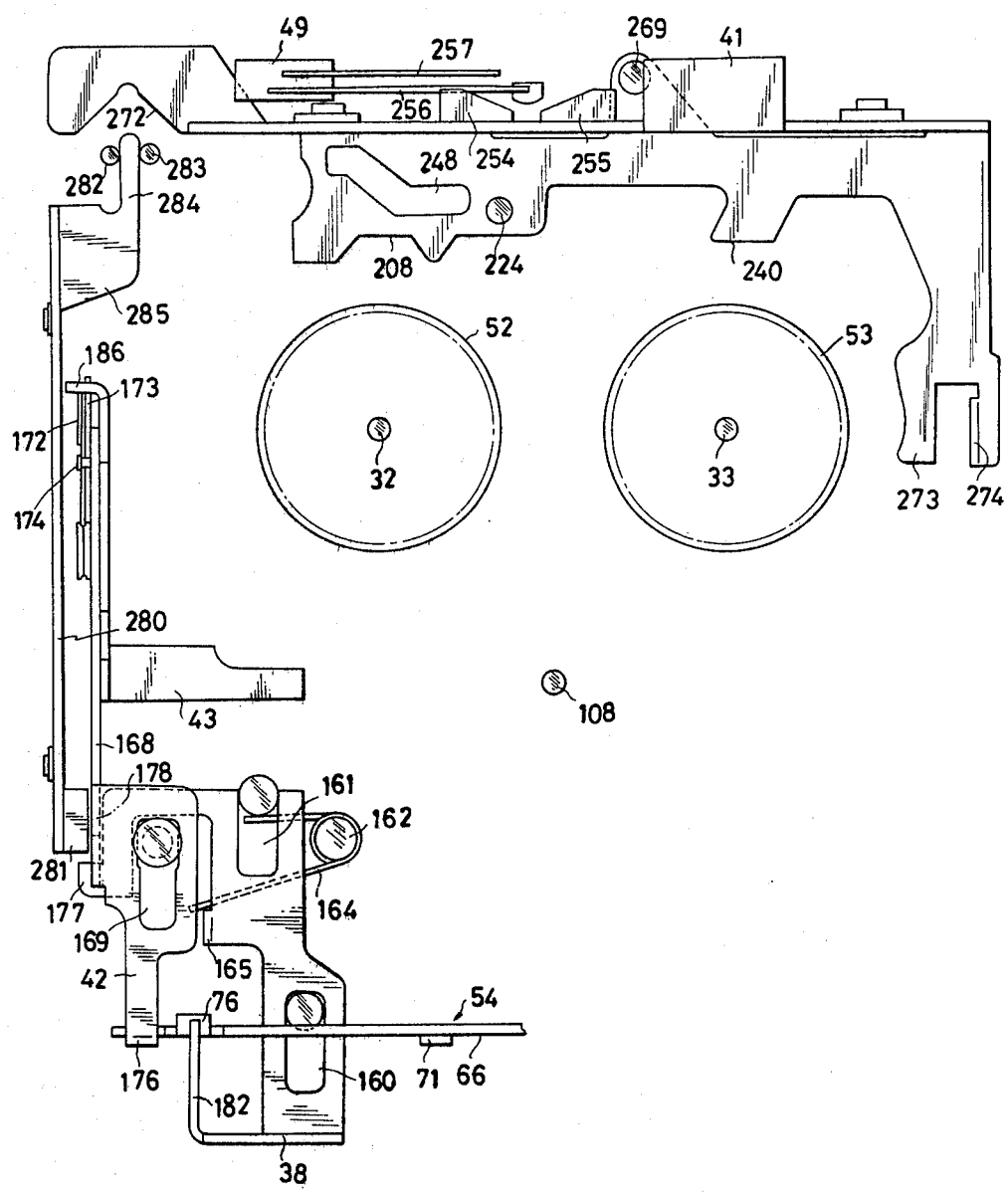
FIG. 11 is a top plan view mainly showing a stop button plate and a shift button plate.

As seen from FIGS. 11 and 12, the ejecting plate 42 located above the base plate has a bent strip 168 which is on the left side of the base plate, and is guided in its way of sliding by a pair of guides 169 and 170 each consisting of a guide pin on the base plate and a guide slot defined in the ejecting plate 42. The guide 169 is subject to play so that the ejecting plate 42 may move upward. Both ends of a torsion spring 173 wound around a pin 172 on the left side of the base plate press on the guide pin of the guide 170 and a pin 174 on the bent strip 168, respectively, whereby the ejecting plate 42 is biased toward its original position. Moreover, the original position of the ejecting plate 42 is restricted by the abutment of the guide pin of the guide 170 against the end face of the guide slot thereof. The ejecting plate 42 has a curved guide strip 176 at its outward end so that it may slide over the upper edge of the seesaw lever 66. The bent strip 168 has a shoulder 178 capable of engaging an operating strip 177 which protrudes from the stop button 38. Furthermore, a cam strip 182 capable of abutting against the guide strip 76 on the upper edge of the seesaw lever 66 extends inward from a front upright wall of the stop button plate 38.

As seen from FIG. 12, the ejecting lever 43 to jump up above the base plate is rockably mounted on the base plate by means of the pin 172 on the left side of the base plate. One end of the torsion spring 173 pressing on the pin 174 of the bent strip 168 further extends to engage a lateral engaging strip 183 on the ejecting lever 43. The pin 174 penetrates the bent strip 168 to extend on the other side thereof. Such one end of the torsion spring 173 first presses on the pin 174 to urge the ejecting plate 42 toward its original position and then engages the engaging strip 183. The torsion spring 173 also functions as a play arrester for the ejecting lever 143.

Figure 9:
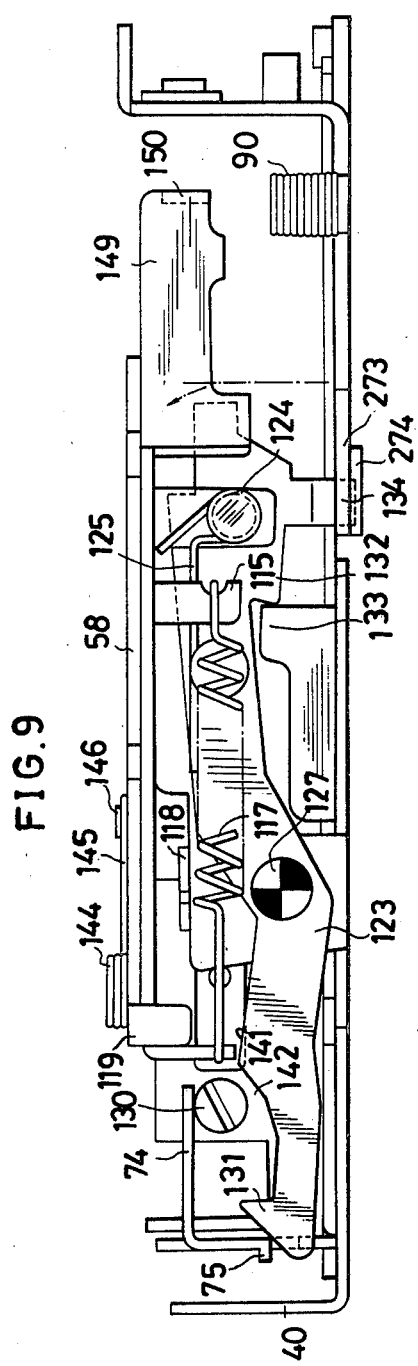
FIG. 9 is a right side view in the recording mode.

When the playback button plate 39 is pressed, the seesaw lever 66 of the lock mechanism 54 rocks clockwise around the shaft 71 to lock the playback button plate 39 to the depressed position, as described above. In this locked position, the seesaw lever 66 is lowered on the recording button plate side and raised on the stop button plate side. On the raised side, as shown in FIG. 12, the upper edge of the seesaw lever 66 abuts against the lower surface of the ejecting plate 42, thereby rocking the ejecting plate 42 counterclockwise around the guide pin of the guide 170 of the ejecting plate 42 to force up the same against the biasing force of the torsion spring 173. In the position where the ejecting plate 42 is forced up by the seesaw lever 66, the shoulder 178 of the ejecting plate 42 is moved up to such a position that it cannot engage the operating strip 177 of the stop button plate 38 (see FIG. 13). Accordingly, even if the stop button plate 38 is pressed in the playback or recording mode where the playback button plate 39 is locked, the operating strip 177 will not engage the shoulder 178 and will therefore not cause the ejecting plate 42 to slide, allowing only the stop button plate 38 to slide. When the stop button plate 38 is pressed, however, the cam strip 182 of the stop button plate 38 will abut against the guide strip 76 of the seesaw lever 66 to press down the guide strip 76, thereby rocking the seesaw lever 66 counterclockwise against the biasing force of the torsion spring 70. Since the lock strip 77 of the seesaw lever 66 is lifted by the counterclockwise rocking of the seesaw lever 66 (see FIG. 4), the playback button plate 39 is returned smoothly to its original position by the biasing force of the torsion spring 99. In the recording mode where the recording button plate 40 is pressed and locked together with the playback button plate 39, as shown in FIG. 9, the rocking lever 123 of the recording button plate 40 is rocked clockwise to cause the abutment strip 132 of the rocking lever 123 to engage the abutment strip 133 of the playback button plate 39, whereby the recording button plate 40 is locked. Accordingly, when the playback button plate 39 is released from the locked position and returned to its original position, the recording button plate 40 is also returned to its original position by the biasing force of the coil spring 117, following the action of the abutment strip 133. At the same time, the eccentric pin 130 is disengaged from the notch 142, and the rocking lever 123 rocks against the biasing force of the torsion spring 125 to return to its original position where the upper edge 142 abuts against the eccentric pin 130.

As mentioned above, the stop button 14 on the stop button plate 38 combines the stopping function to return the playback button plate 39 singly or together with the recording button plate 40 with the ejecting function to operate the ejecting plate 42. That is, when the playback button plate 39 is in its original position, the ejecting plate 42 will never be forced up by the seesaw lever 66, leaving the shoulder 78 of the ejecting plate 42 in the passage of the operating strip 177 of the stop button plate 38, as shown in FIG. 12. Therefore, when the stop button plate 38 is pressed, the operating strip 177 engages the shoulder 178 to slide the ejecting plate 42 together with the stop button plate 38, thereby causing the pin 174 of the ejecting plate 42 to press on an end face of the ejecting lever 43. When the stop button plate 38 is further pushed in, the ejecting lever 43, pressed by the pin 174, rocks counterclockwise around the pin 172 to jump up against the biasing force of the torsion spring 173, as shown in FIG. 14. The tape cassette is ejected by such jump of the ejective lever 43. Thus, the stop button 14 on the stop button plate 38 performs its stopping function in the playback and recording modes, and serves as an ejector button in the stop mode. The stop button 14 with such dual function may not only reduce the number of components used through the elimination of the ejector button, but also greatly improves the operating capability of the tape recorder.

The driving mechanism 60 to transmit driving force from the motor to the reel shafts 32 and 33 is provided with the flywheel 59 which rotates with the capstan shaft 108. As shown in FIGS. 15 and 16, the flywheel 59 is formed by metal such as brass, and external and internal gears 187 and 188 formed of plastic are disposed at the central portion and along the inside of the outer periphery of the flywheel 59, respectively. The external gear 187 has a flanged annular portion 189 on the gate side and wedge-shaped engaging strip 190 protruding from the inner peripheral surface thereof into a brass wheel body 191 to engage the same, so that it is perfectly prevented from coming off and falling in the thrust and radial directions. Also, the internal gear 188 has a number of flange strips 193 (only partially shown in FIG. 15) on the gate side and a wedge-shaped engaging strip 194 protruding from the outer peripheral surface thereof into the wheel body 191 to engage the same, whereby the internal gear 188 is prevented from coming off and falling in the thrust and radial directions. Thus, there may be obtained an inexpensive flywheel perfectly free from slipping and falling by lockingly engaging the internal and external gears made of plastic on the wheel body made of metal. In consequence, there may be obtained a play-free tape recorder with reduced gear noise.

Figure 17:
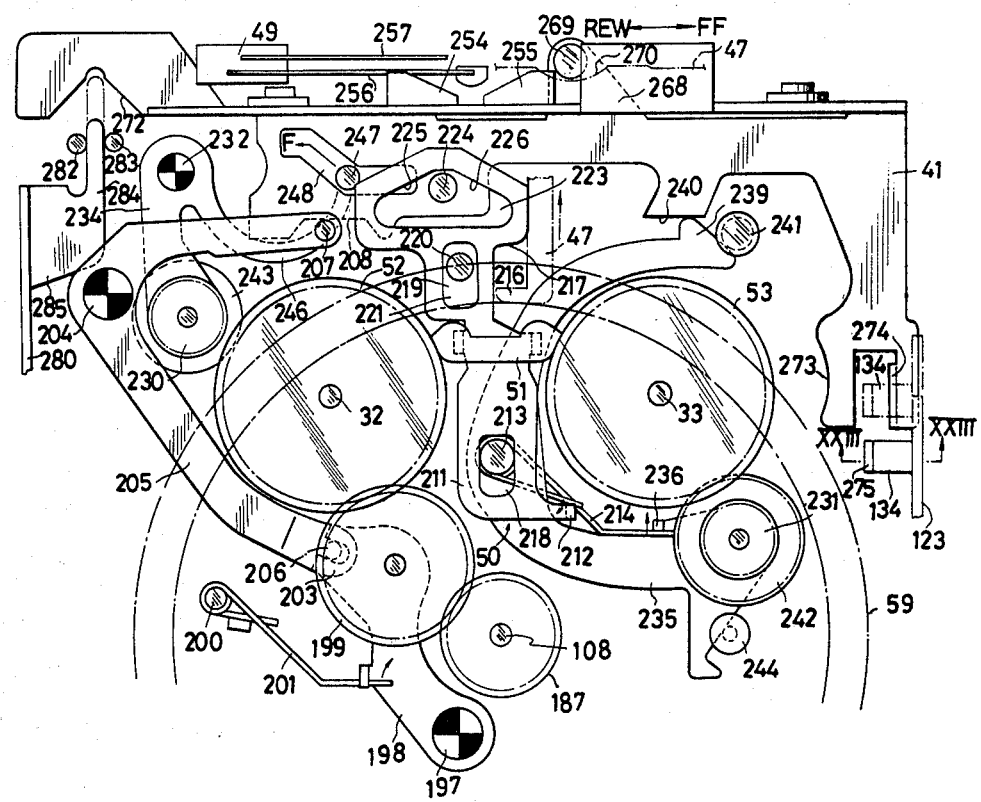
FIGS. 17, 19 and 21 are top plan views of the shift button plate in the neutral, FF and REW positions, respectively.

As shown in FIG. 17, the driving mechanism 60 includes an idler gear 199 for regular run or operation mounted on a regular run lever 198 which is rockably mounted on the base plate by means of a shaft 197. The regular run idler gear 199 engages the external gear 187 of the flywheel 59 and the reel gear 52, biased thereto by a torsion spring 201 wound around a pin 200 on the base plate. In a regular run, therefore, driving force transmitted from the motor (not shown) to the flywheel 59 by means of an endless belt (not shown) is transmitted to the reel gear 52 on the take-up reel side via the external gear 187 of the flywheel 59 and the idler gear 199. The regular run lever 198 has a forked strip 203 at its free end, in which a guide pin 206 is restrained, the guide pin 206 being embedded at one end of a regular run release lever 205 rockably mounted on the base plate by means of a shaft 204, and extending upward. Accordingly, the regular run release lever 205 is biased counterclockwise around the rocking shaft 204 by the torsion spring 201 through the guide pin 206. Also, a guide pin 207 is embedded at the other end of the regular run release lever 205, extending downward to engage a cam face 208 of the shift button plate 41 by means of the biasing force of the torsion spring 201. However, if the shift button plate 41 is slid from the neutral position shown in FIG. 17 to the FF or REW position shown in FIG. 19 or 21, the guide pin 207 is pressed against the cam face 208, and clockwise rocking force around the rocking shaft 204 is applied to the regular run release lever 205. Hereupon, the regular run release lever 205 and regular run lever 198 are coupled to each other, with the guide pin 206 restrained by the forked strip 203. Accordingly, the lever 205 rocks clockwise around the rocking shaft 204 against the biasing force of the torsion spring 201, while the lever 198 rocks counterclockwise around the shaft 197. When the regular run lever 198 rocks counterclockwise around the shaft 197, the idler gear 199 on the lever 198 is moved to such a position that it may engage neither of the external gear 187 and reel gear 52, thereby releasing the regular run. When the shift button plate 41 is in the FF or REW position, the guide pin 207 is pressed against the cam face 208 by the biasing force of the torsion spring 201, and the idler gear 199 is securely maintained in the regular run release position. The construction and operation of the shift button plate 41 will later be described.

As shown in FIGS. 3 and 17, the brake mechanism 50 includes a brake lever 211 fitted with the brake shoe 51 which, made of rubber or other soft material, touches the reel gears 52 and 53. One end of a torsion spring 214 wound around a pin 213 on the base plate presses on a downward bent strip 212 of brake lever 211, whereby the brake shoe 51 on the brake lever 211 is pressed against the reel gears 52 and 53 to keep these gears from rotating. Instead of employing such direct contact system, the brake shoe 51 may be brought in touch with discs (not shown) on the same shafts of the reel gears 52 and 53. When the playback button plate 39 is pressed against the biasing force of the spring 99, an abutment strip 216 of the second playback button plate 47 engages a shoulder 217 of the brake lever 211, so that the brake lever 211 slides along with the playback button plate 39. The slide of the brake lever 211 is guided by a pair of guides 218 and 219 each consisting of a guide pin on the base plate and a guide slot defined in the brake lever 211. The guide 219 has its guide pin 220 and guide slot 221 fully spaced from each other so as to allow the brake lever 211 to rock. On the other hand, the guide pin of the guide 218 functions also as the pin 213 around which the torsion spring 214 is wound. A triangular cam slot 223 is defined at one end of the brake lever 211, and a guide pin 224 on the shift button plate 41 protrudes into the cam slot 223. When the shift button plate 41 is slid to the FF or REW position, the guide pin 224 abuts against a cam face 226 or 225 to slide the brake lever 211 against the biasing force of the torsion spring 214 in such a direction that the brake shoe 51 moves away from the reel gears 52 and 53.

As seen from FIG. 17, the driving mechanism 60 further includes FF and REW gears 230 and 231 mounted on respective one ends of FF and REW levers 234 and 235 which are rockably mounted on the base plate by means of shafts 232 and 213. The shaft of the REW lever 235 functions also as the guide pin 213 around which the torsion spring 214 is wound. The other end of the torsion spring 214 presses on a downward bent strip 236 of the REW lever 235, urging the REW lever 235 to rock counterclockwise around the shaft 213. A guide strip 239 formed on the other end of the REW lever 235 is pressed against a cam face 240 of the shift button plate 41 and an annular-grooved guide pin 241 by the biasing force of the torsion spring 214. The REW lever 235 is guided in its action by a guide pin 244. At the one end of the REW lever 235, an intermediate gear 242 capable of engaging the internal gear 188 of the flywheel 59 is mounted on the same shaft of the REW gear 231 and thereunder. At the one end of the FF lever 234, on the other hand, a pulley 243 capable of being pressed against the outer peripheral surface of the flywheel 59 through an endless belt 249 is mounted on the same shaft of the FF gear 230 and thereunder. The FF lever 234 is formed of an elastic sheet metal, having a narrow curved arm 246 at one end portion. An upwardly extending guide pin 247 is embedded in the free end of the curved arm 246, protruding into a cam slot 248 defined in the shift button plate 41. When the shift button plate 41 is set in the FF mode, the curved arm 246 is deformed with the guide pin 247 pressed in the direction of arrow F against the cam face of the cam slot 248, serving as a spring to urge the FF lever 234 to rock counterclockwise around the rocking shaft 232. Thus, since the one end of the FF lever 234 functions as a spring, the FF lever 234 requires no torsion spring of its own, enabling a reduction of components in number as well as simplification of construction.

Figure 18:
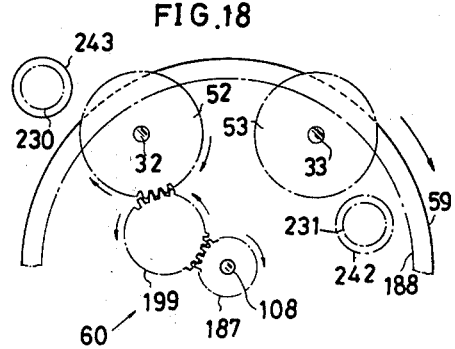
FIGS. 18, 20 and 22 illustrate transmission paths of driving force with the shift button plate in the neutral, FF and REW position, respectively.
Figure 20:
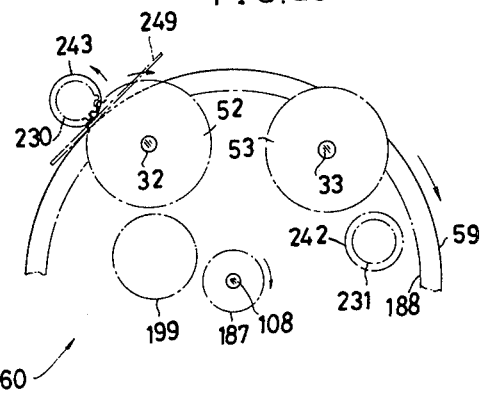
Figure 22:
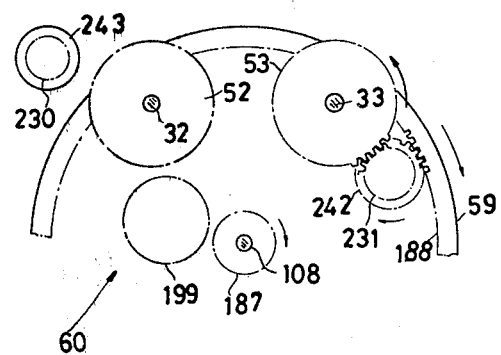

Now there will successively be described transmission paths of driving force in the driving mechanism 60 of the above-mentioned construction in connection with the several shift positions—neutral, FF and REW. Referring to FIG. 18 showing the neutral position, the external gear 187 of the flywheel 59 engages the idler gear 199, which in turn engages the reel gear 52, so that driving force transmitted to the flywheel 59 is further transmitted to the reel shaft 32, enabling the reel shaft 32 to function as a take-up reel shaft for regular run. In the FF mode, as described above, the FF lever 234 is rocked counterclockwise around the shaft 232 by the biasing force of the curved arm 246, and the pulley 243 is pressed against the outer periphery of the flywheel 59 through the endless belt 249, causing the FF gear 230 to engage the reel gear 52, as shown in FIG. 20. Since the guide pin 207 is guided to the cam face 208 by the slide of the shift button plate 41, the regular run release lever 205 rocks clockwise around the shaft 204, and the regular run lever 198 rocks counterclockwise around the shaft 197, against the biasing force of the torsion spring 201. As a result, the idler gear 199 is disengaged from both the reel gear 52 and the external gear 187 of the flywheel 59. Thus, in the FF mode, the driving force is transmitted from the flywheel 59 to the pulley 243, as shown in FIG. 20. Naturally, the pulley 243 has a smaller diameter and fewer teeth than those of the flywheel 59, so that it rotates at high speed, causing the reel gear 52 to rotate clockwise like the flywheel 59 at high speed by means of the FF gear 230 on the same shaft of the pulley 243. As a result, the reel shaft 32 rotates at high speed as a take-up reel shaft for fast-forward operation. In the REW mode, moreover, the guide strip 239 is guided to the slope of the cam face 240, so that the REW lever 235 rocks counterclockwise around the guide pin 213 or pivotable shaft 213 against the biasing force of the torsion spring 214. Accordingly, the REW gear 231 and the intermediate gear 242 engage the reel gear 53 and the internal gear 188 of the flywheel 59 respectively, as shown in FIG. 22. Further, like the case of the FF mode, the guide pin 207 is guided to the cam face 208, so that the idler gear 199 rocks clockwise around the shaft 204 to be disengaged from both the reel gear 52 and the external gear 187. Thus, through the engagement between the internal gear 188 of the flywheel 59 and the intermediate gear 242, the driving force causes the REW gear 231 and hence the reel gear 53 to rotate at high speed. Since the driving force is transmitted through the internal gear 188, the rotating direction of the reel gear 53 is opposite to that of the flywheel 59, so that the reel shaft 33 rotates counterclockwise at high speed as a take-up reel for rewinding operation.

As described above, the shift button plate 41 has the cam slot 248 to restrain the guide pin 247 of the FF lever 234, and the cam faces 208 and 240 against which the guide pin 207 of the regular run release lever 205 and the guide strip 239 of the REW lever 235 abut respectively. The cam faces 208 and 240 each has a level portion and a slope portion or portions. The guide pin 224 inside the cam slot 223 of the brake lever 211 is embedded in the top side of the shift button plate 41. Further, the shift button plate 41 has a vertical bent strip 250 facing the rear side of the base plate, and is guided in its sliding by a pair of guides 251 and 252 each consisting of a guide pin or machine screw on the base plate and a guide slot defined in the bent strip 250, as shown in FIG. 23. A pair of wedge-shaped switch operating strips 254 and 255 formed of plastic or some other insulating material protrude from the vertical bent strip 250. When the shift button plate 41 is slid, one of the switch operating strips 254 and 255 abuts against a movable contact 256 of the power switch 49 to bring the movable contact 256 in contact with a fixed contact 257, thereby turning the power switch 49 on (see FIGS. 19 and 21). The shift button plate 41 has a series of oval locating holes 258, 259 and 260 defined in the bent strip 250 so that the plate 41 may be located securely by the quick-ball system as it is called. Further, a steel ball 263 in a perforation bored through a suspended portion 261 of the base plate is so biased as to be able to be fitted in any one of the locating holes by a leaf spring 262 attached to the suspended portion 261. When the shift button plate 41 is in the neutral position, as shown in FIG. 23, the steel ball 263 is partially fitted in the locating hole 259, the largest one in the center. A guide pin 269 protrudes upward from a horizontal projecting strip 268 of the shift button plate 41. When the playback button plate 39 is pressed, the guide pin 269 abuts against a cam face 270 (FIG. 3) of the second playback button plate 47 to push back the second playback button plate 47 a little (FIGS. 19 and 21), thereby setting the cue or review mode. As seen from FIG. 17, moreover, the shift button plate 41 has a cam face 272 with a facing pair of slopes and a forked strip 273 capable of engaging the engaging strip 134 on the rocking lever 123 of the recording button plate 40. As shown in FIG. 24, the forked strip 273 has a downward bent portion 274, while the engaging strip 134 has an upward bent portion 275.

Figure 19:
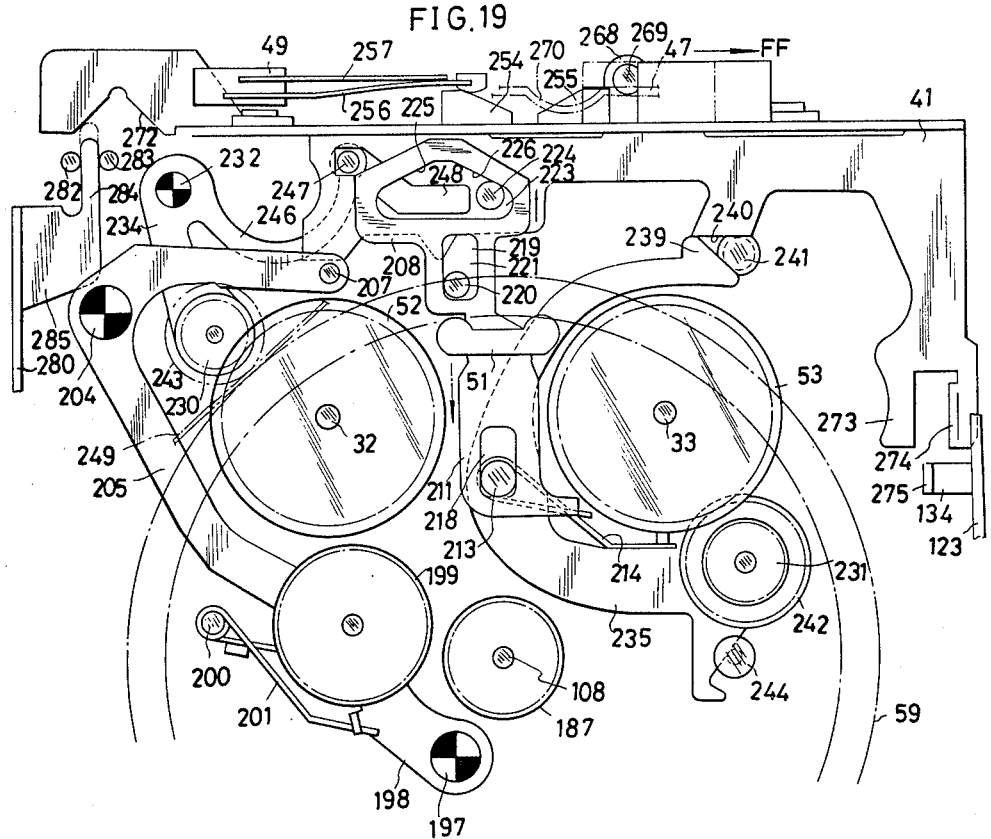

Now there will be described in detail the FF mode which is set by sliding button plate 41 from the neutral position of FIG. 17 toward the right of the drawing to the FF position shown in FIG. 19. First, the description of the operation or action of the several components of the driving mechanism 60 will be repeated. When the guide pin 207 is moved by the cam face 208, the regular run release lever 205 rocks clockwise around the shaft 204 against the biasing force of the torsion spring 201, and the regular run lever 198 rocks counterclockwise around the shaft 197, with the guide pin 206 restrained by the forked strip 203. At the same time, the idler gear 199 on the regular run lever 198 is disengaged from the external gear 187 of the flywheel 59 and the reel gear 52. Further, the guide pin 247 is guided in the direction indicated by arrow F within the cam slot 248, and the curved arm 246 is deformed to bias the FF lever 234 counterclockwise around the shaft 232. Thus, the FF gear 230 on the FF lever 234 is pressed against the reel gear 52 to engage the same, and the pulley 243 is pressed against the outer peripheral surface of the flywheel 59 through the endless belt 249. As for the REW lever 235, it never rocks although the shift button plate 41 is slid toward the FF position, because the guide strip 239 is still in contact with the level portion of the cam face 240. Accordingly, the REW gear 231 and intermediate gear 242 still remain in their respective non-operating positions where they are separated from the reel gear 53 and the internal gear 188 of the flywheel 59, respectively. Thus, as seen from FIG. 20, the driving force is transmitted from the flywheel 59 through the pulleys 243 and FF gear 230 to the reel gear 52, causing the reel shaft 32 to rotate at high speed. The brake mechanism 50 operates as follows. When the shift button plate 41 is slid toward the FF position, the guide pin 224 on the shift button plate 41 abuts against the cam face 226 of the cam slot 223 to slide the brake lever 221 against the biasing force of the torsion spring 214, thereby disengaging the brake shoe 51 from the reel gears 52 and 53 to release the brake mechanism. Then, the switch operating strip 254 abuts against the movable contact 256 of the power switch 49 to bring the movable contact 256 in contact with the fixed contact 257, thereby turning the power switch 40 on to start the motor (not shown).

Now there will be described the cue mode which is set by sliding the shift button plate 41 to the FF position with the playback button plate 39 locked to the retreated position. In this case, the power switch 49 is already turned on by the second playback button plate 47 of the playback button plate 39 (see FIG. 3), so the switch operating strip 254 plays no sifgnificant role. When the playback button plate 39 is in its lock position with the shift button plate 41 in the neutral position, the cam face 270 of the second playback button plate 47 is adjacent to the guide pin 269 of the shift button plate 41 (see FIG. 17). Therefore, if the shift button plate 41 is slid toward the FF position, the guide pin 269 abuts against the cam face 270 to push back the second playback button plate 47 a little, as indicated by two-dot chain line in FIG. 19. Hereupon, as mentioned before, the second playback button plate 47 is elastically coupled to the first playback button plate 46, with the pin 94 (FIG. 3) on the second playback button plate 47 biased toward the stopper strip 95 of the first playback button plate 46 by the torsion spring 93. Accordingly, the displacement of the second playback button plate 47 produced by the shift button plate 41 is absorbed by the deformation of the torsion spring 93, perfectly keeping the first playback button plate 46 from movement. By the little displacement of the second playback button plate 47, the pinch roller 34 and magnetic head 35 are separated a little from the magnetic tape. As a result, a narrow gap is created between the pinch roller 34 and the capstan shaft 108, enabling the setting of the cue mode in which the reel shaft 32 is quickly rotated clockwise with the magnetic tape barely touched by the magnetic head 35.

When the recording button plate 40, as well as the playback button plate 39, is in its lock position, however, the shift button plate 41 will never be slid to the FF position if it is pushed toward such position. Namely, when the recording button plate 40 is locked, the engaging strip 134 of the rocking lever 123 is located over the forked strip 273 of the shift button plate 41 as indicated by one-dot chain line of FIG. 17. As seen from FIG. 24, the downward bent strip 274 formed on one prong of the forked strip 273 faces the slope of the engaging strip 134, while the other prong of the forked strip 273 faces the upward bent strip 275 of the engaging strip 134. Therefore, if intended to be slid toward the FF position, the shift button plate 41 will be prevented from moving by the engagement between the forked strip 273 and the upward bent strip 275 of the engaging strip 134. Thus, the shift button plate 41 will never be slid even if it is thrust toward the FF position by mistake in the recording mode, so that erroneous operation will perfectly be prevented.

Figure 21:
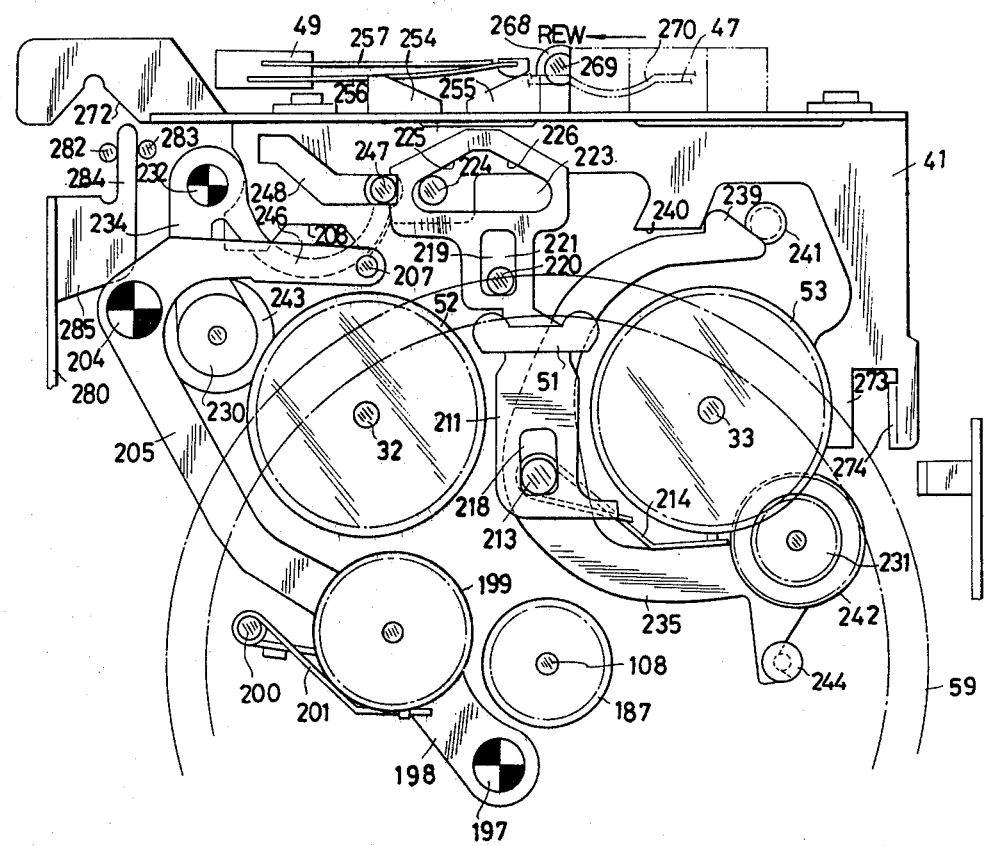

Now there will be described in detail the REW position which is set by sliding the shift button plate 41 from the neutral position of FIG. 17 toward the left of the drawing to the REW position shown in FIG. 21. First, the description of the operation of the driving mechanism 60 will be repeated. When the guide pin 207 is moved by the cam face 208, the idler gear 199 is disengaged from the external gear 187 and reel gear 52 by way of the same operations as in the setting of the FF mode. Further, the guide pin 247 moves only linearly in the cam slot 248 to keep the curved arm 246 from deformation, so that there is produced no biasing force. This, the FF lever 234 is not moved, and the FF gear 230 and pulley 243 still remain in their non-operating positions. Meanwhile, the REW lever 235 is rocked counterclockwise around the pin or rocking shaft 213 by the biasing force of the torsion spring 214 so that the guide strip 239 may abut against the slope of the can face 240, and then the REW gear 231 and intermediate gear 242 are caused to engage the reel gear 53 and the internal gear 188 of the flywheel 236, respectively. Thus, as shown in FIG. 22, the driving force is transmitted from the flywheel 59 through the internal gear 188 to the gears 242 and 231 and the reel gear 53, causing the reel shaft 33 to rotate at high speed. In this case, the reel shaft 33 rotates in the opposite direction to the rotating direction of the flywheel 59 because the driving force is transmitted via the internal gear 188. The driving mechanism 50 operates as follows. When the shift button plate 42 is slid toward the REW position, the guide pin 224 on the shift button plate 41 abuts against the cam face 225 of the cam slot 223 to disengage the brake shoe 51 from the reel gears 52 and 53, thereby releasing the brake force. Meanwhile, the switch operating strip 255 abuts against the movable contact 256 to bring it in contact with the fixed contact 257, thereby turning the power switch 49 on to start the motor (not shown).

Now there will be described the review mode which is set by sliding the shift button plate 41 to the REW position with the playback button plate 39 locked, whether singly or together with the recording button plate 40, to the retreated position. In this case, the power switch 49 is already turned on, so the switch operating strip 255 plays no significant role. When the playback button plate 39 is in its lock position with the shift button plate 41 in the neutral position, the cam face 270 of the second playback button plate 47 is adjacent to the guide pin 269 of the shift button plate 41. Therefore, if the shift button plate 41 is slid toward the REW position, the guide pin 269 abuts against the cam face 270 to push back the second playback button plate 47 a little, as indicated by the chain lines of FIG. 19, in the same manner for the setting of the cue mode. As a result, like the case of the cue mode setting, the narrow gap is created between the pinch roller 34 and the capstan shaft 108, enabling the setting of the review mode in which the reel shaft 33 is rotated counterclockwise with the magnetic tape barely touched by the magnetic head 35. Hereupon, when the recording button plate 40, as well as the playback button plate 39, is in its lock position, the engaging strip 134 of the rocking layer 123 is located over the forked strip 273 of the shift button plate 41 as indicated by one-dot chain line of FIG. 17. Unlike the case of the cue mode setting, however, if the shift button plate 41 is pushed toward the REW position, the downward bent strip 274 of the forked strip 273 will abut against the slope of the engaging strip 234 to force up the same, as seen from FIG. 24. Thus, the shift button plate 41 can slide without being hindered by the engaging strip 134. At this time, since the engaging strip 134 is forced up by the downward bent strip 274, the rocking lever 123 rocks counterclockwise around the shaft 127 against the biasing force of the torsion spring 125, thereby disengaging the abutment strip 132 from the abutment strip 133 of the second playback button plate 47 (see FIG. 7). Hereupon, the rocking lever 123 rocks until the abutment strip 131 at its outward end is located below the engaging strip 75 of the seesaw lever 66 of the lock mechanism 50. When the abutment strip 132 is disengaged from the abutment strip 133 to be set free, the recording button plate 40 is returned to its original position by the biasing force of the coil spring 117. When the recording button plate 40 is returned, the abutment strip 131 passes under the engaging strip 75 without abutting against the same, so that the seesaw lever 66 will not move from the position to lock the playback button plate 39, keeping the playback button plate 39 in its lock position. In short, if the shift button plate 41 is slid to the REW position in the recording mode, only the recording button plate 40 is returned to its original position, while the playback button plate 39 remains in the lock position. Thus, recorded sounds may be reproduced immediately by setting the tape recorder for the REW mode while recording, which means an increase in the operating capability of the tape recorder.

Figure 25:
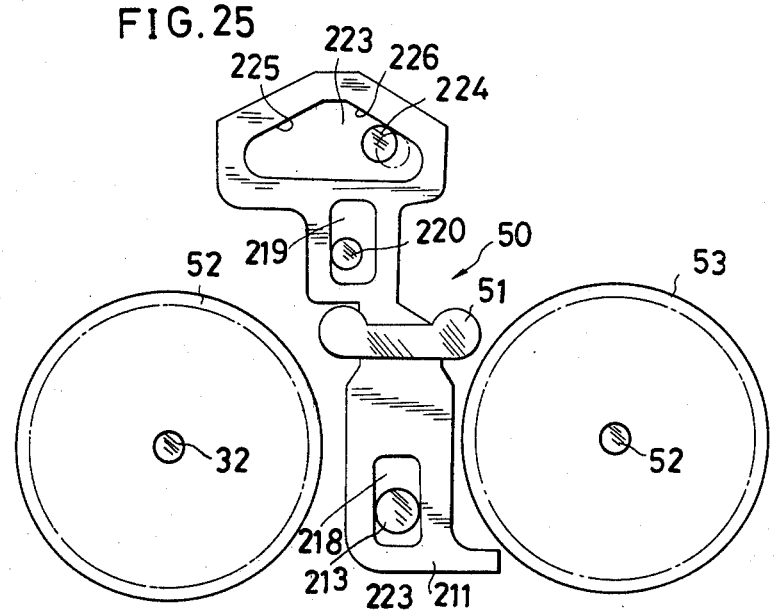
FIGS. 25 and 26 are motion diagrams of a brake mechanism showing how the shift button plate is returned from the FF position to the neutral position.
Figure 26:
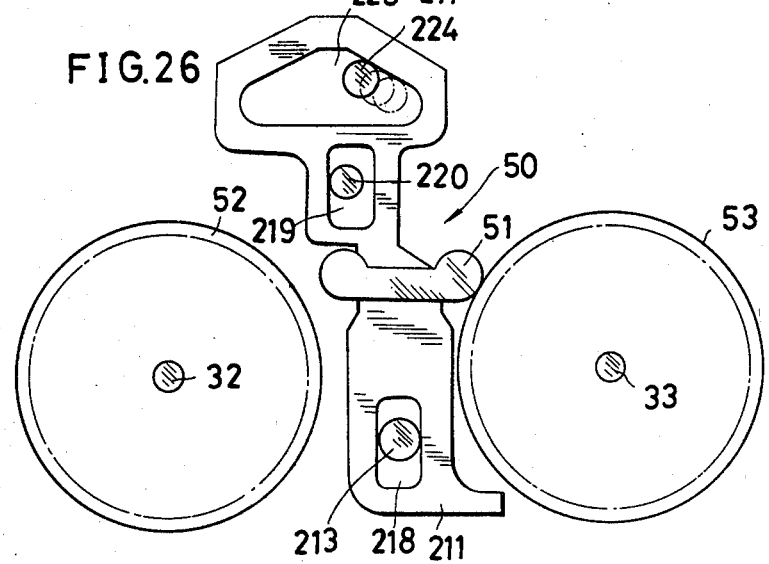

If the shift button plate 41 is pushed toward the neutral position of FIG. 17 to be returned thereto from the FF or REW position, then the levers 198, 205, 234 and 235 will rock in the opposite directions to the aforesaid several directions to return to their respective original positions. When switching the shift button plate 41 from the FF or REW position to the neutral position, the magnetic tape is generally subject to slack. Such slack of the tape can be prevented by braking the reel on the take-up side after braking the reel on the supply side. Therefore, in the brake mechanism 50, a gap wide enough to allow the brake lever 211 to rock is defined between the guide pin 220 of the guide 219 and the guide slot 221. If the shift button plate 41 is slid from the FF position of FIG. 19 to the left of the drawing, the guide pin 224 of the shift button plate 41 also slides to the left. Since the brake lever 211 is urged by the torsion spring 214 in the direction to bring the brake shoe 51 in touch with the reel gears 52 and 53, the movement of the guide pin 224 causes the cam face 226 to be pushed back in the direction of the arrow while abutting against the guide pin 224. Since the gap between the guide pin 220 and the guide slot 221 is wide enough to allow the rocking of the brake lever 211, the brake lever 211 is moved as it is rocked clockwise around the pin 213, as shown in FIG. 25. Thus, when the guide pin 224 moves further, the brake shoe 51 on the brake lever 211 first touches the reel gear 53 on the supply side to brake the reel shaft 33, as shown in FIG. 26, and then abuts against the reel gear 52 on the take-up side to brake the reel shaft 32, thereby restoring the perfect brake position as shown in FIG. 17. If the shift button plate 41 is slid from the REW position to the right, on the other hand, the brake lever 211 is moved as it is rocked counterclockwise around the pin 213. Accordingly, the brake shoe 51 first touches the reel gear 52 on the supply side for the REW mode and then touches the reel gear 53 on the take-up side, thereby restoring the perfect brake position of FIG. 17.

Thus, in the brake mechanism 50, one of the paired guides 218 and 219 enjoys the gap to allow the rocking of the brake lever 211. In switching the shift button plate 41 from the FF or REW position to the neutral position, therefore, the brake shoe 51 may first touch the supply-side reel gear to brake the supply-side reel shaft before touching the take-up-side reel gear to brake its corresponding reel shaft. That is, the pair of the reel shafts will never simultaneously be braked. In other words, the reel shaft on the take-up side will not be braked until enough back tension is applied to the tape by braking the supply-side reel shaft in the first place. Thus, the tape can have no chance of suffering slack.

Figure 27:
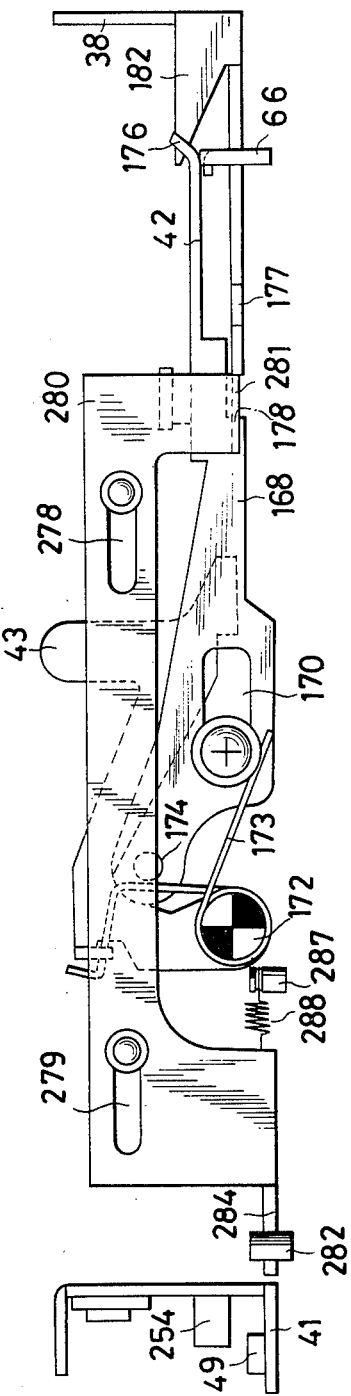
FIG. 27 is a left side view mainly showing a FF.REW release plate in the stop mode.

It is to be understood that when the shift button plate 41 is slid toward the FF or REW position, the steel ball 263 is disengaged from the central locating hole 259 and fitted in the locating hole 258 or 260 (see FIG. 23). However, the tape recorder 10 is so constructed that the shift button plate 41 may automatically be returned to the neutral position even if the stop button 14 is pressed while the shift button plate 41 is locked to the FF or REW position by the quick-ball system. To this end, as shown in FIGS. 11 and 27, an FF·REW release plate 280 runs in parallel with the bent strip 168 of the ejecting plate 42 beside the base plate, guided by guides 278 and 279. The FF·REW release plate 280 has respectively at both ends thereof an inwardly bent engaging strip 281 capable of engaging the operating strip 177 of the stop button plate 38 and an inwardly bent strip 285 with a guide strip 284 which faces the cam face 272 of the shift button plate 41 and is guided by a pair of guides 282 and 283 on the base plate. Further, the FF·REW release plate 280 is urged toward the stop button plate 38 by a tension coil spring 288 stretched between itself and a pin 287 on the base plate. Hereupon, as illustrated, the engaging strip 281 is located closer to the operating strip 177 than the shoulder 178 of the ejecting plate 42. Accordingly, if the stop button plate 38 is pressed while the seesaw lever 66 is located in its original position to enable the stop button plate 38 to perform its ejecting function, the operating strip 177 of the stop button plate 38 will first abut the engaging strip 281 of the FF·REW release plate 280 to push the FF·REW release plate 280 toward the shift button plate 41 against the biasing force of the coil spring 288 before engaging the shoulder 178 of the ejecting plate 42. When the shift button plate 41 is in the neutral position, the guide strip 284 of the FF·REW release plate 280 does not engage the cam face 272, as indicated by one-dot chain line in FIG. 17. If the shift button plate 41 is in the FF position shown in FIG. 19, however, the guide strip 284 will abut against the cam face 272 to push the shift button plate 41 in the direction of an arrow in one-dot chain line. When the shift button plate 41 is moved to some extent in the direction of the arrow to cause the steel ball 263 to be partially fitted in the central locating hole 259, the steel ball 263 will suddenly fall into the locating hole 259 by means of the biasing force of the leaf spring 262. Thus, with the quick-ball system including the large-diameter central locating hole 259 and the steel ball 263 pressed by the leaf spring 262, the shift button plate 41 can be located in the neutral position by only moving it until the steel ball 263 is partially fitted in the central locating hole 259, without returning the shift button plate 41 fully to the neutral position. Thus, the shift button plate 41 may be shifted with ease by utilizing the quick-ball system along with the FF·REW release plate 280. Also, when the shift button plate 41 is in the REW position shown in FIG. 21, the shift button plate 41 may easily be moved from the REW position to the neutral position through the engagement between the guide strip 284 and the cam face 272, in the same manner as aforesaid. Further, the ejecting lever 43 may be operated by further sliding the stop button plate 38 to press the operating strip 177 against the shoulder 178 of the ejecting plate 42. Thus, a single press on the stop button 14 may achieve direct cassette ejection in the FF or REW mode, as well as the aforesaid stopping and ejecting functions. This is a significant improvement in the operating capability of the tape recorder.

Figure 28:
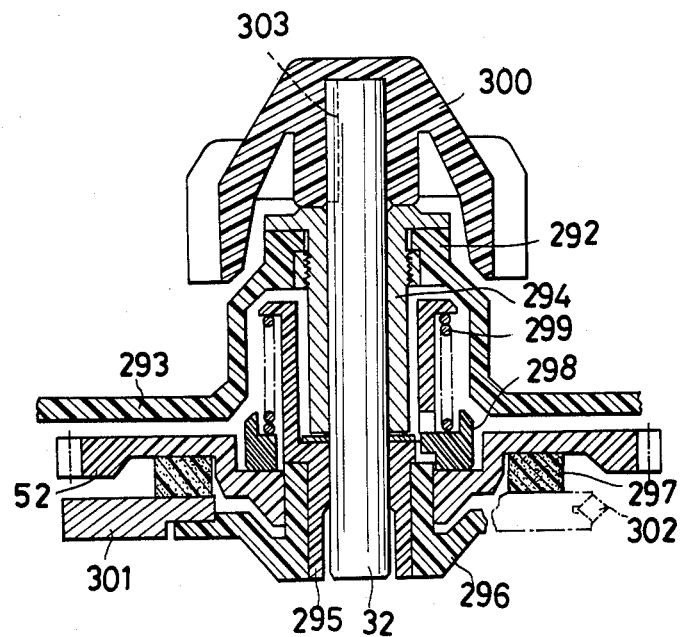
FIG. 28 is a longitudinal sectional view of a reel mechanism.

Referring now to FIG. 28, there will be described in detail the take-up reel of the reel machanism. A reel cover 292 is formed integrally with a base plate 293 made of synthetic resin, and a reel shaft bearing section is formed by engaging the external thread on a sleeve bearing 294 with the internal thread on the reel cover 292. Such integral structure of the reel cover 292 with the base plate 293 will result in a reduction of components in number as well as an improvement in the appearance of the tape recorder. A support cylinder 295 is forcedly put on the bottom end portion of the reel shaft 32, while a disc 296 is forcedly put on the support cylinder 295. Further, the reel gear 52 is disposed on the disc 296 through a felt plate 297. A seat member 298 with an abutment strip to be fitted in a hole of the support cylinder 295 is pressed against the reel gear 52 by the biasing force of a compression coil spring 299. The reel shaft 32 is inserted upwardly into the sleeve bearing 294, and is fitted with a plastic rotation stopper 300 at its top end. Tape counting may be performed electrically by combining a magnetic sensing element (not shown) with a magnet ring 301 having alternately arranged magnetic poles and disposed on the disc 296. Instead of using such construction, the tape counting may be done mechanically by using an endless belt 302 stretched between the disc 296 as a pulley and a tape counter pulley (not shown). In order to improve the appearance of the rotation stopper 300, an air-escape slit 303 is preferably defined in the reel shaft 32 without boring any air-escape hole in the top portion of the stopper 300. If needed, however, a small air-escape hole for supplementary use may be formed in the top of the rotation stopper 300.

In the tape recorder 10, as shown in FIG. 1, a cassette holder spring 310 to abut the rear side of the cassette has a pair of forked strips 311 and 312. The cassette holder spring 310 may be located in place on the rear side of the base plate by engaging the forked strips 311 and 312 respectively with engaging projections 313 and 314 formed on the rear side of the base plate. Such interlocking cassette holder spring 310 facilitates the attachment thereof.

Moreover, in the illustrated tape recorder, all the levers and plates including the base plate are compacted into a three-layer structure, enabling reduced thickness of the tape recorder as a whole.

According to this invention, as described above, the cassette tape recorder is provided with playback, recording, and stop button plates slidably mounted in parallel on a base plate, and the recording button plate is pressed independently after the playback button plate is pressed or together with the playback button plate to engage the same so as to be locked to a recording position. The cassette tape recorder is further provided with a lock mechanism including a seesaw lever mounted on the base plate within a plane across the sliding direction of the playback button plate. The seesaw lever has at one end portion thereof a lock means capable of engaging the playback button plate, and rocks to cause the lock means to engage the playback button plate when the playback button plate is pressed, whereby the playback button plate is locked to a retreated position and the other end portion of the seesaw lever is moved to such a position that it can engage the stop button plate. Additionally, the cassette tape recorder includes an ejecting plate which detects the difference between the displacement of the seesaw lever in the playback or recording mode (in which the playback button plate is pressed) and that in the stop mode, and slides engaged with the stop button plate when the stop button plate is pressed in the stop mode. In the playback mode, the playback button plate is retreated, so the seesaw lever is rocked in the one direction to shift its other end portion to the position where it can engage the stop button plate. Accordingly, if pressed in the playback or recording mode, the stop button plate will engage the other end portion of the seesaw lever to rock the seesaw lever in the other direction. The rocking of the seesaw lever in the other direction causes the lock means to be disengaged from playback button plate, so that the playback button plate returns from the retreated position to its original position. Since the playback button plate is pressed together with the recording button plate also in the recording mode, it will be returned to the original position by pressing the stop button plate. Thus, the tape recorder may be switched to the stop mode by pressing the stop button plate in the playback or recording mode. If the stop button plate is pressed in the stop mode, on the other hand, it will engage the ejecting plate to slide therewith. The slide of the ejecting plate results in cassette ejection. That is, cassette ejection may be performed by pressing the stop button plate in the stop mode.

Thus, the single control member or the stop button plate can selectively perform the shifting to the stop mode and the cassette ejection, improving the operating capability of the tape recorder. According to this invention, moreover, the seesaw lever is mounted on the base plate within a plane across the sliding direction of the playback button plate, and the playback button plate is locked by such seesaw lever in the playback or recording mode. Since the seesaw lever is not laid on the playback button plate but is suitably disposed in space that has conventionally been a dead space, overlapping of the plate members may be reduced. Further, both the playback and recording button plates can be locked by locking only the playback button with the seesaw lever since the recording button plate may engage the playback button plate separately. In consequence, there may be produced a compact and inexpensive cassette tape recorder of simple construction which includes reduced number of components.

Futhermore, the tape recorder is preferably so constructed that, when the stop button plate is pressed, a shift button plate is shifted from an FF or REW position to a neutral position by an FF·REW release plate which may slide with the stop button plate. With such construction, the shifting of the shift button plate to the neutral position and the shifting of the tape recorder to the stop mode may be executed in succession by pressing the stop button plate but once. Also, by pressing the stop button plate once, the neutral shifting and cassette ejection may be performed successively. Thus, the cassette tape recorder may be further improved in operating capability.

What we claim is:

1. A cassette tape recorder comprising:
playback, recording, and stop button plates urged to their respective original positions by the biasing forces of first, second and third biasing means and slidably mounted in parallel on a base plate, said recording button plate being pressed independently after said playback button plate is pressed or together with said playback button plate to engage the same so as to be locked to a recording position;
a lock mechanism including a seesaw lever mounted on said base plate within a plane across the sliding direction of said playback button plate, said seesaw lever having at one end portion thereof a lock means capable of engaging said playback button plate, and rocking in one direction to cause said lock means to engage said playback button plate when said playback button plate is pressed from its original position against the biasing force of the first biasing means, whereby said playback button plate is locked to a retreated position and the other end portion of said seesaw lever is moved to such a position that said other end portion can engage said stop button plate; and
an ejecting plate detecting the difference between the displacement of said seesaw lever in the playback or recording mode and the displacement of said seesaw lever in the stop mode, and slidingly engaged with said stop button plate when said stop button plate is pressed against the biasing force of the third biasing means in the stop mode.

2. A cassette tape recorder according to claim 1, further comprising an ejecting lever urged toward its original position by the biasing force of a fourth biasing means and liftably mounted on said base plate; wherein said ejecting plate has a detection strip capable of engaging the upper edge of said seesaw lever at said other end portion thereof, is urged toward its original position, and is slidably mounted on said base plate so that the other-end upper edge of said seesaw lever abuts against said detection strip to lift up said ejecting plate to a position where said ejecting plate cannot engage said stop button plate when said seesaw lever is rocked to its lock position, and that said ejecting plate abuts against said ejecting lever to jump the same when said ejecting lever is slid together with said stop button plate.

3. A tape recorder according to claim 2, wherein said base plate is formed of synthetic resin and said seesaw lever is attached to a front wall of said base plate.

4. A tape recorder according to claim 2, wherein the lock means of said seesaw lever is pressed against a stepped strip.

5. A tape recorder according to any one of claims 1 to 4, wherein said recording button plate includes a first abutment strip abutting against said playback button plate to retreat said playback button plate unitedly when said recording button plate is pressed, and a rockable lever disposed beside said base plate in a plane at right angles to the seesaw lever of said lock mechanism; said first abutment strip being pressed by said playback button plate when said playback button plate is returned from the playback position to the original position, whereby said return is allowed; and said rocking lever having at one end position thereof a second abutment strip capable of engaging a third abutment strip formed on said playback button plate and rocking to cause the second abutment strip of said rocking lever to engage the third abutment strip of said playback button plate when said recording button plate is pressed against the biasing force of said second biasing means to be retreated from the original position thereof to a recording position, whereby said recording button plate is prevented from returning from the recording position to the original position.

6. A tape recorder according to claim 5, wherein said playback button plate includes a bent strip which is touched by the first abutment strip of said recording button plate when said recording button plate is pressed, and abuts against said abutment strip when said playback button plate is returned.

7. A cassette tape recorder according to any one of claims 1 to 4, further comprising a slidable shift button plate having a cam face and sliding in one direction from a neutral position to set up a fast-forward (FF) mode and sliding in the other direction to set up a rewinding (REW) mode, and an FF·REW release plate having a guide strip capable of abutting against the cam face of said shift button plate, urged toward its original position by the biasing force of a sixth biasing means, and slidably mounted on said base plate in the same direction of said playback button plate, said FF·REW release plate engaging said stop button plate to slide together therewith when said stop button plate is slid, whereby said guide strip will abut against said cam face to return said shift button plate to the neutral position if said shift button plate is in an FF or REW position.

8. A cassette tape recorder according to claim 7, wherein said shift button plate is slidably mounted on said base plate along a direction across the sliding direction of said playback button plate, and the cam face of said shift button plate has a pair of slopes.

9. A cassette tape recorder according to claim 7, wherein said FF·REW release plate is located in such a position that said FF·REW release plate can engage said stop button plate before said ejecting plate engages said stop button plate.

10. A tape recorder according to claim 9, wherein said seesaw lever of said lock mechanism has on an upper edge at said one end portion thereof a second engaging strip to engage a stopper pin to restrict the rocked position of said seesaw lever.

11. A tape recorder according to any one of claims 1 to 4, wherein said ejecting plate includes a guide strip capable of engaging the upper edge of said seesaw lever at said other end portion thereof, urged toward its original position by the biasing force of a sixth biasing means, and slidably mounted on said base plate so that the other-end upper edge of said seesaw lever abuts against said guide strip to lift up said ejecting plate when said seesaw lever is rocked to the lock position; and an ejecting lever urged toward its original position by the biasing force of the sixth biasing means and lifably mounted on said base plate so that said ejecting lever is jumped against the biasing force of the sixth biasing means when said ejecting plate is pushed against the biasing force of the sixth biasing means; and wherein said stop button plate includes a cam strip to abut against the otherend upper edge of said seesaw lever to rock said seesaw lever against the biasing force of the fourth biasing means when said stop button plate is pushed in against the biasing force of the third biasing means, and an operating strip to engage said ejecting plate thereby unitedly sliding the same if said ejecting plate is not lifted and not to engage said ejecting plate if said ejecting plate is lifted when said stop button plate is pressed.

12. A tape recorder according to claim 11, wherein the sixth biasing means of said ejecting plate is a torsion spring functioning also as the sixth biasing means of said ejecting lever, one end of said torsion spring engaging both said ejecting plate and said ejecting lever.

13. A tape recorder according to claim 12, wherein said torsion spring of the sixth biasing means of said ejecting plate engages one end portion of a pin extending through said ejecting plate, said pin tending to abut against an edge of said ejecting lever to jump the same when said ejecting plate is engagedly pushed.

14. A tape recorder according to claim 11, wherein said ejecting plate has a shoulder for engaging the operating strip of said stop button plate.

15. A cassette tape recorder comprising:
playback, and stop button plates urged to their respective original positions by the biasing forces of first, and second biasing means and slidably mounted in parallel on a base plate;
a lock mechanism including a seesaw lever mounted on said base plate within a plane across the sliding direction of said playback button plate, said seesaw lever having at one end portion thereof a lock means capable of engaging said playback button plate, and rocking in one direction to cause said lock means to engage said playback button plate when said playback button plate is pressed from its original position against the biasing force of the first biasing means, whereby said playback button plate is locked to a retreated position and the other end portion of said seesaw lever is moved to such a position that said other end portion can engage said stop button plate; and
an ejecting plate detecting the different between the displacement of said seesaw lever in the playback or recording mode and the displacement of said seesaw lever in the stop mode, and slidingly engaged with said stop button plate when said stop button plate is pressed against the biasing force of the second biasing means in the stop mode.

* * * * *

UNITED STATES PATENT AND TRADEMARK OFFICE
CERTIFICATE OF CORRECTION

PATENT NO. : 4,319,295

DATED : March 9, 1982

INVENTOR(S) : Kazuyasu MOTOYAMA, et al

It is certified that error appears in the above-identified patent and that said Letters Patent is hereby corrected as shown below:

COLUMN 24, cancel claim 15.

On Title page after abstract "15 Claims" should read -- 14 Claims --.

Signed and Sealed this

Seventeenth Day of April 1984

[SEAL]

Attest:

GERALD J. MOSSINGHOFF

Attesting Officer

Commissioner of Patents and Trademarks